United States Patent [19]

Hokari et al.

[11] Patent Number: 4,787,021

[45] Date of Patent: Nov. 22, 1988

[54] CURRENT-TYPE CONVERTER APPARATUS

[75] Inventors: Sadao Hokari; Kiyoshi Nakamura, both of Katsuta; Katsu Komuro, Mito; Takeki Ando, Ibaraki; Hiromi Inaba, Katsuta; Shigeta Ueda, Hitachi, all of Japan

[73] Assignee: Hitachi, Ltd., Tokyo, Japan

[21] Appl. No.: 143,121

[22] Filed: Jan. 12, 1988

[30] Foreign Application Priority Data

Jan. 14, 1987 [JP] Japan .................................. 62-4844
Mar. 24, 1987 [JP] Japan .................................. 62-67914

[51] Int. Cl.$^4$ ........................................... H02M 5/458
[52] U.S. Cl. ......................................... 363/37; 363/51; 363/53; 318/376; 318/762; 318/803; 187/114
[58] Field of Search .................... 363/35, 37, 41, 51, 363/53, 56, 78, 79, 80, 84, 97, 98, 127, 132; 318/139, 762, 798, 799, 800, 801, 802, 803, 806, 808, 376; 187/112, 114, 116, 119

[56] References Cited

U.S. PATENT DOCUMENTS

| | | | |
|---|---|---|---|
| 4,545,464 | 10/1985 | Nomura | 318/762 |
| 4,620,272 | 10/1986 | Fulton et al. | 363/37 |
| 4,620,296 | 10/1986 | Siemon | 363/37 |
| 4,666,020 | 5/1987 | Watanabe | 363/37 |
| 4,672,520 | 6/1987 | Ueda et al. | 363/37 |
| 4,683,412 | 7/1987 | Bialek et al. | 318/762 |

FOREIGN PATENT DOCUMENTS

| | | |
|---|---|---|
| 59-102770 | 6/1984 | Japan . |
| 61-102172 | 5/1986 | Japan . |
| 2188173 | 9/1987 | United Kingdom . |
| 2187312 | 9/1987 | United Kingdom . |

Primary Examiner—Peter S. Wong
Attorney, Agent, or Firm—Antonelli, Terry & Wands

[57] ABSTRACT

A current-type converter including a DC power source, a current-type converter, a load and a converter control unit, the converter control unit controlling so as to cause as least two states among a powering conduction state for supplying power from said DC power source to said load within predetermined control periods of both a powering control mode and a regenerative control mode, a regenerative conduction state for regenerating power supplied from the load toward the DC power source, and a reflux conduction state for short-circuiting the output of the current-type converter and returning the circuit current of the load, and the converter control unit varying the period length of respective states.

17 Claims, 27 Drawing Sheets

4,787,021

CURRENT-TYPE CONVERTER APPARATUS

BACKGROUND OF THE INVENTION

The present invention relates to a current-type converter apparatus, and in particular to a current-type converter apparatus suitable to output voltage control of a current-type converter using DC voltage as a power source and suitable to power conversion to the load in service interruption of the AC power source.

For an apparatus which controls a load such as a motor using a current-type converter including self-arc-suppressing devices such as transistors, there is a need of driving the motor even in service interruption of the Ac power source. As the prior art for satisfying such a need, a technique described in JP-A No. 61-102172, for example, is known. In this prior art, a DC power source such as a battery is used as a power source, and power supply means is disposed for controlling the output voltage of the DC power source by causing the power conversion operation of the above described current-type converter or a separately disposed apparatus, thus power being supplied to a load such as a motor.

In the above described prior art, only power running control means is considered, and braking means is not considered. For example, output voltage characteristics of output voltage obtained by the power supply means when the above described motor is changed to the power generation state by a load coupled to the motor has not been considered.

In general, a control device such as a semiconductor device included in a power supply means such as a current-type converter cannot be driven with a pulse width not larger than the minimum pulse width defined by the characteristics of that device. Therefore, the above described power supply means has a problem that the output voltage abruptly changes in a portion resulting in discontinuous characteristics. Further, there is a problem that the load cannot be controlled stably in the above described discontinuous output voltage region.

An object of the present invention is to provide a control unit of a current-type converter capable of having continuous output voltage characteristics even when a DC source is used as the power source.

Another object of the present invention is to provide a current-type converter unit capable of performing not only the power running control but also the electrical braking control of a motor even in service interruption of the current-type converter using an AC power source as the power source.

SUMMARY OF THE INVENTION

In accordance with the present invention, a current-type converter apparatus includes a DC voltage source, a current-type converter, a load and a converter unit, and in order to cancel DC voltage peculiar to an arc-suppressing device included in the converter, which is outputted when the current-type converter is operated in chopper mode with the minimum pulse width, a DC voltage having a polarity opposite to that of the above described DC voltage is generated within the identical conversion control period.

That is to say, objects of the present invention can be attained by controlling, in the conversion control period, the operation state of the current-type converter so as to assume three states described below.

In a powering control mode for supplying power from a DC power source to a load such as a motor, the converter is so controlled as to assume three states including a powering conduction state lasting not shorter than the minimum pulse width for supplying power from the DC source to the load, a reflux state in which the DC circuit is short-circuited to return the circuit current, and a regenerative conduction state having a fixed width in which power from the load is regenerated toward the DC power source to cancel the voltage outputted in the powering conduction state when the converter is driven with the minimum pulse width. Time ratios of these three states within the conversion control period are made variable.

In a regenerative control mode for controlling the regenerative power supplied from the load such as a motor, the converter is so controlled, in the same way as the powering control mode, as to assume three states including a regenerative conduction state lasting not shorter than the minimum pulse width for regenerating the power supplied from the load toward the DC power source, a reflux state in which the DC circuit is short-circuited to return the circuit current, and a powering conduction state having a fixed width in which power is supplied from the DC power source to the load to cancel voltage outputted in the regenerative conduction state when the converter is driven with the minimum pulse width. Time ratios of these three states within the conversion control period are made variable.

Further, the object of performing the electrical braking control in running during service interruption of a current-type converter apparatus using an AC power source is attained by a battery forming a power source, means for sensing the output interruption of the AC power source, and a converter control unit for outputting a control signal to the current-type converter to cause the regenerative power conversion in response to the sensing means.

DESCRIPTION OF THE PREFERRED EMBODIMENTS

An embodiment of a current-type converter according to the present invention will now be described in further detail.

Figure 1:
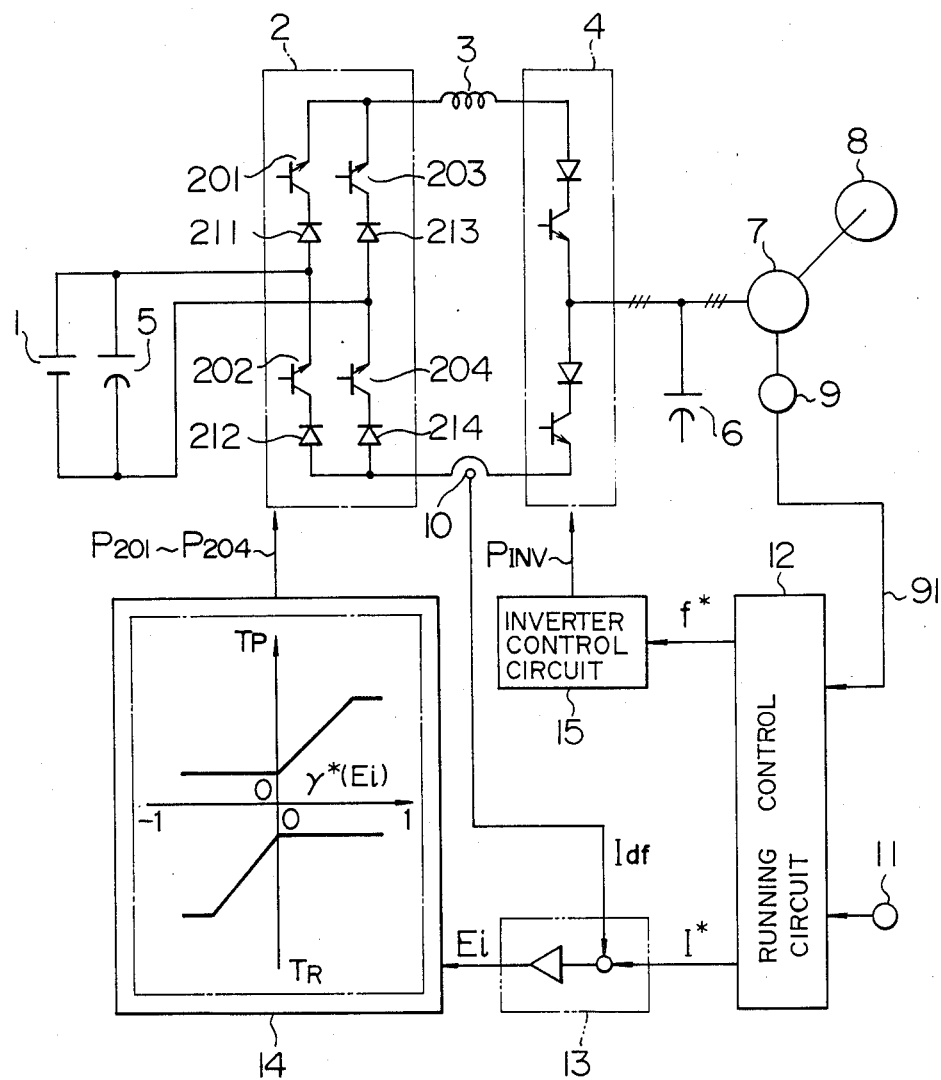
FIG. 1 is a configuration diagram of an embodiment according to the present invention.
Figure 2A:
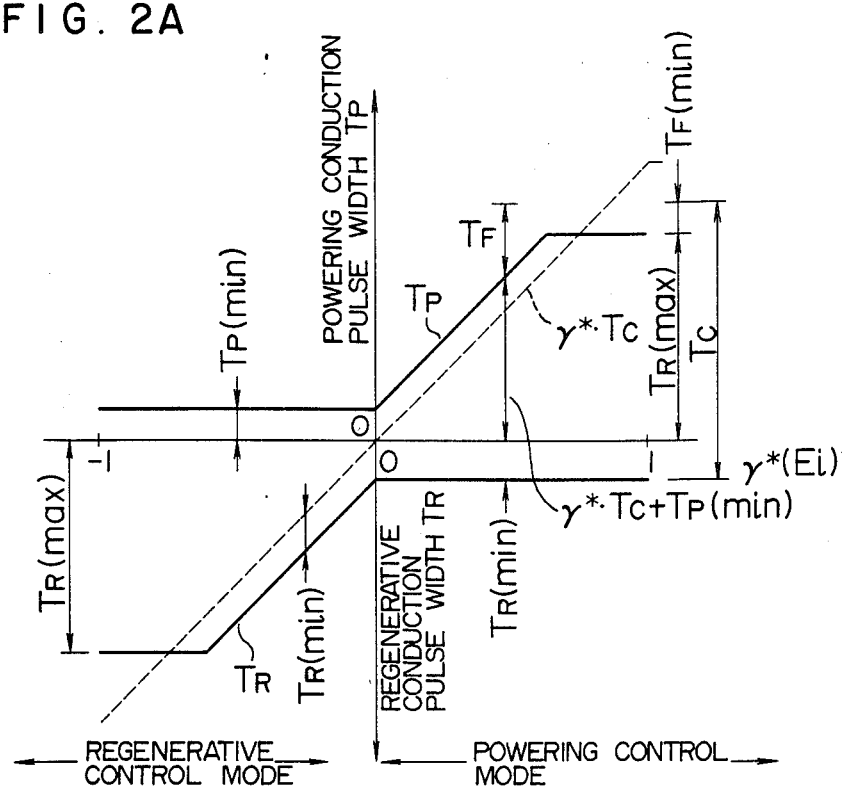
FIGS. 2A and 2B show a control function produced by a control circuit 14 of FIG. 1 and output voltage characteristics of a converter 2.
Figure 2B:
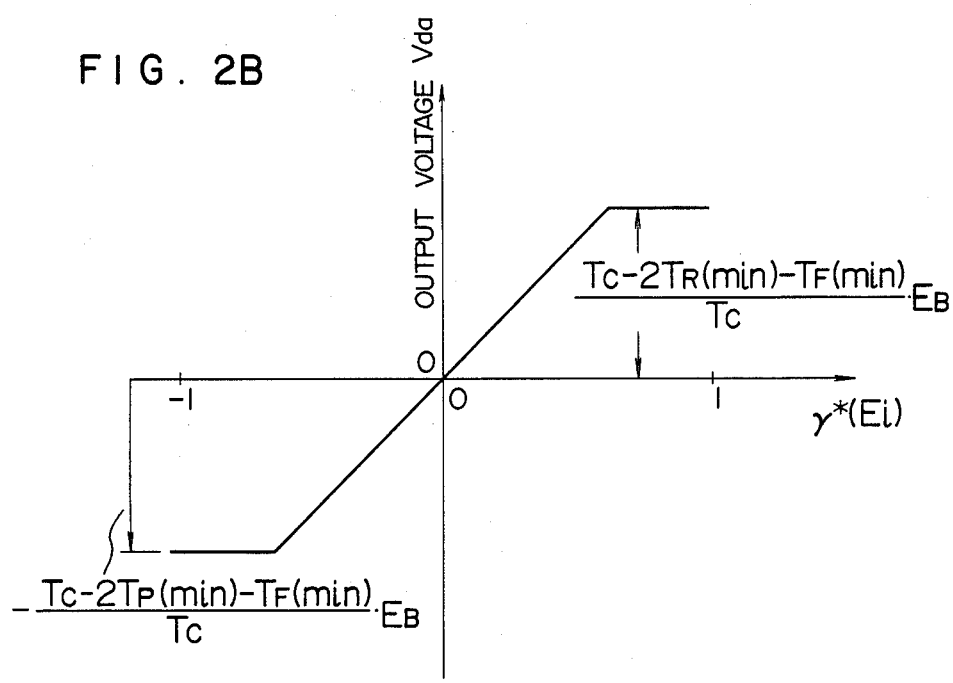
Figure 3:
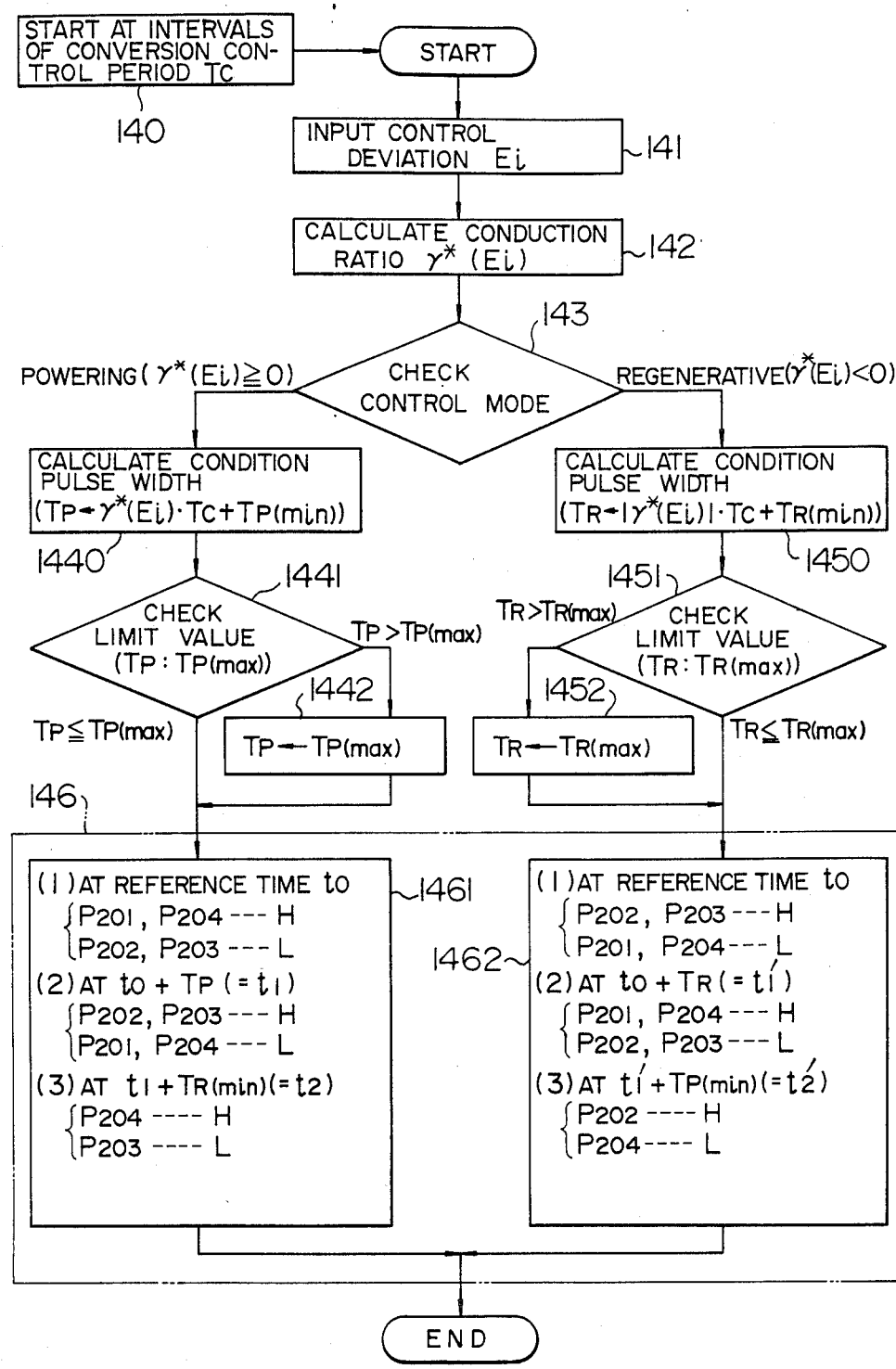
FIG. 3 is a control flow chart of the control circuit 14.
Figure 4:
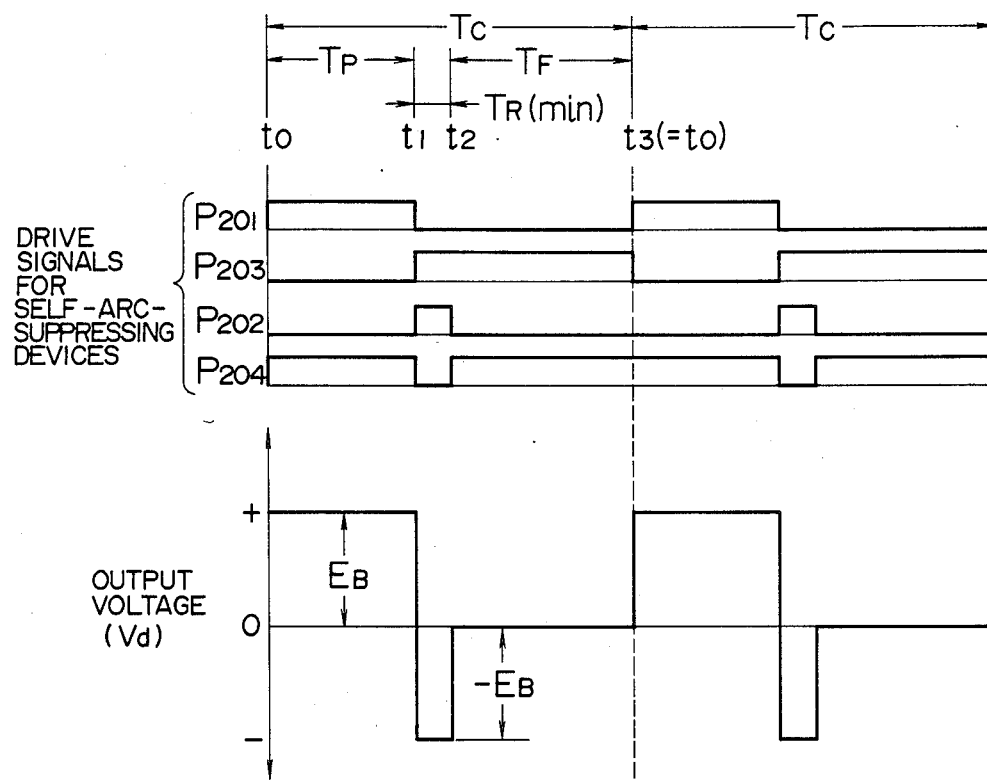
FIG. 4 shows a time chart of respective drive signals in the powering control and its output voltage characteristic diagram.
Figure 5A:
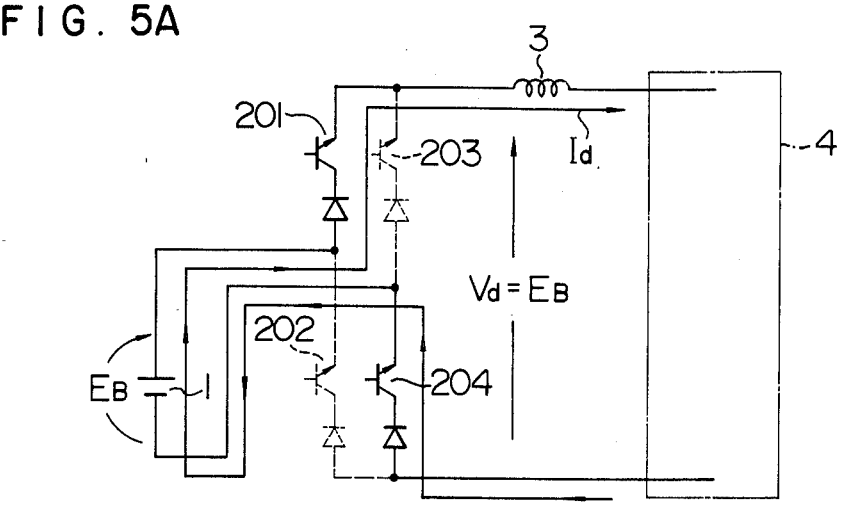
FIGS. 5A, 5B and 5C show three circuit states at FIG. 4, respectively.
Figure 5B:
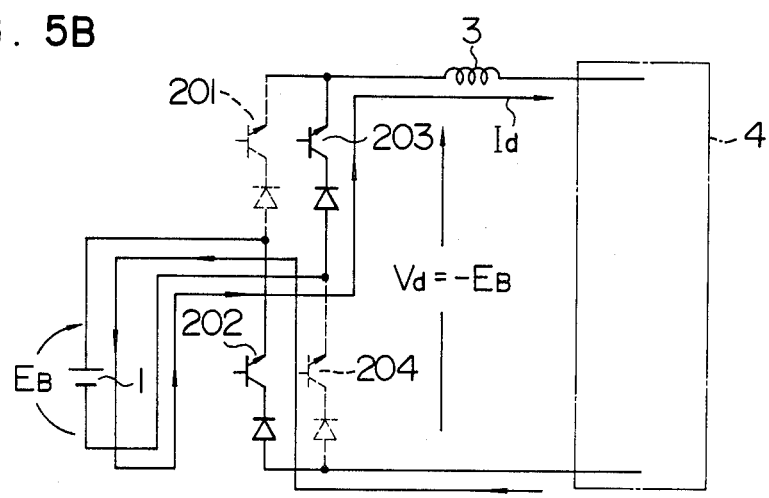
Figure 5C:
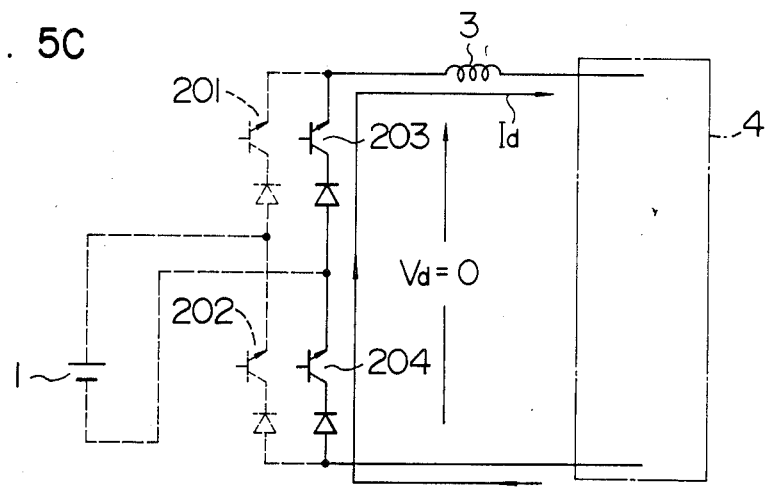
Figure 6:
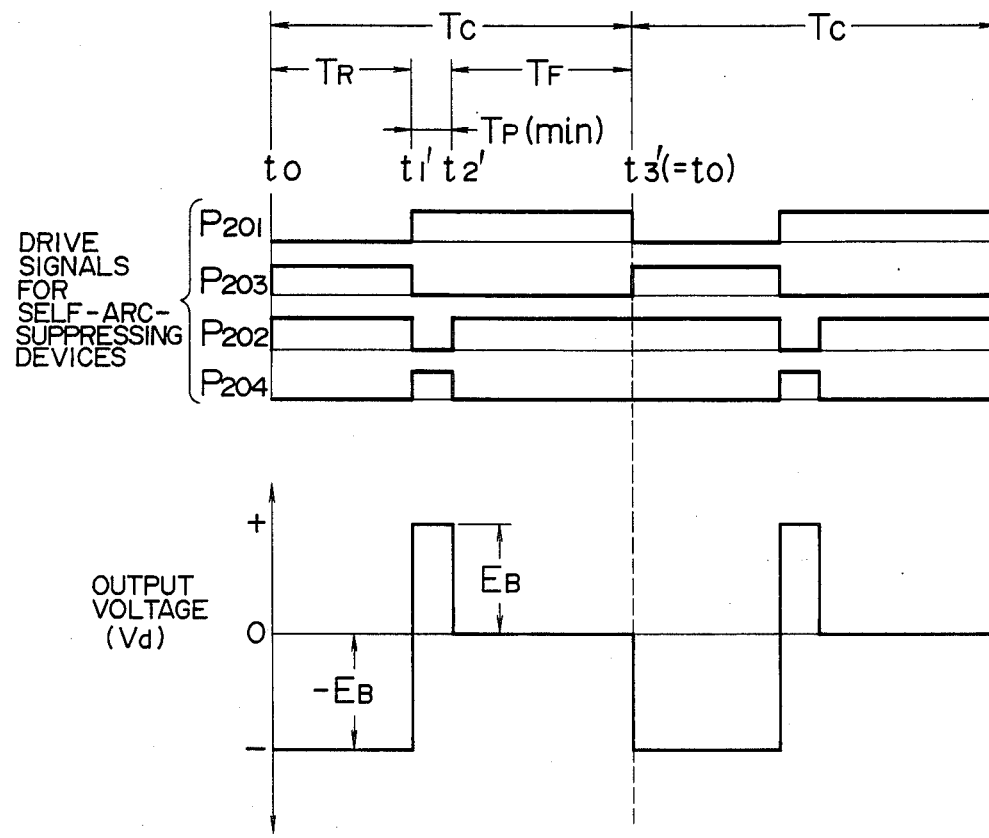
FIG. 6 shows a time chart of respective drive signals in regenerative control and its output voltage characteristic diagram.
Figure 7A:
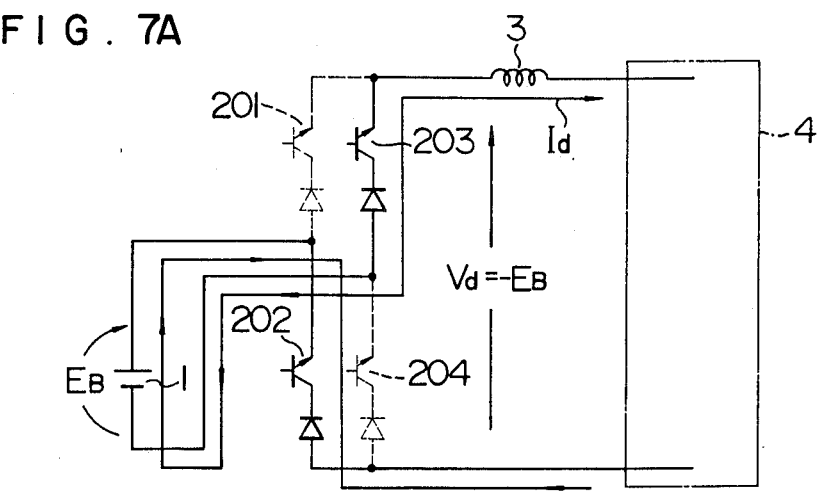
FIGS. 7A, 7B and 7C show three circuit states of FIG. 6, respectively.
Figure 7B:
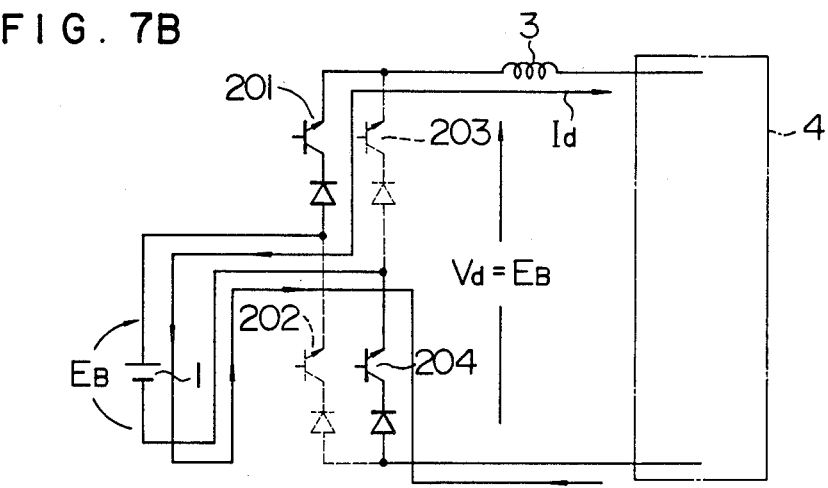
Figure 7C:
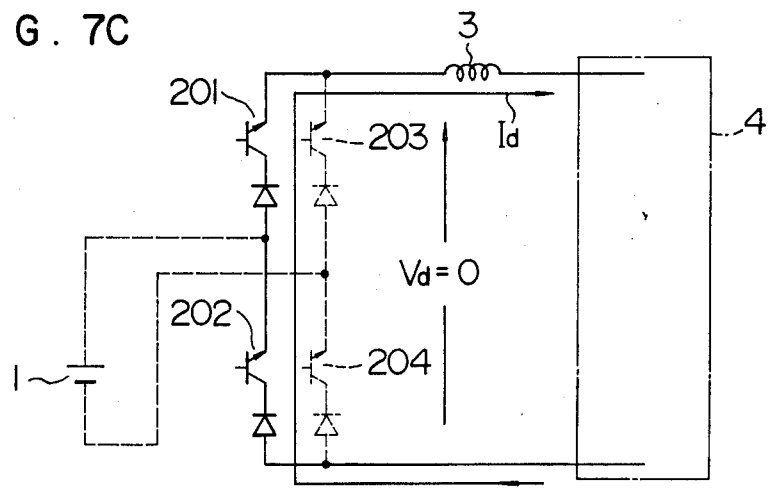

FIG. 1 is a configuration diagram of an embodiment of the present invention. FIGS. 2A and 2B show a control function produced by a control circuit 14 of FIG. 1 and output voltage characteristics of a converter 2. FIG. 3 shows the control flow chart of the control circuit 14. FIG. 4 shows a time chart of respective drive signals in powering control and its output voltage. FIGS. 5A, 5B and 5C show three circuit states of FIG. 4. FIG. 6 shows a time chart of respective drive signals in regenerative control and its output voltage. FIGS. 7A, 7B and 7C show three circuit states.

A current-type converter apparatus shown in FIG. 1 has a battery 1 and a capacitor 5 as a DC power source, and a current-type converter 2 includes self-arc-suppressing devices 201 to 204 and diodes 211 to 214 connected to block reverse voltage.

The converted output of this current-type converter 2 is supplied to the load side via a reactor 3. The load includes an inverter 4, a capacitor 6 connected to the output side of the inverter 4, a motor 7, and a load unit 8.

The current-type converter 2 is controlled by a converter control circuit 14 which outputs control signals P201 to P204 of the self-arc-suppressing devices on the basis of a predetermined control function. Further, this apparatus has a feedback system including a running command input terminal 11 for inputting a running command from the outside, a current detector 10, a running control circuit 12 for receiving a sgnal supplied from an encoder 9, a current control circuit 13, and an inverter control circuit 15.

The configuration and operation of respective units of the apparatus will now be described in detail. In FIG. 1, only self-arc-suppressing devices 201 to 204 and diodes 211 to 214 which are necessary in this case are illustrated as the interval circuit of the converter 2. Therefore, this converter 2 may have configuration similar to that of a chopper circuit used for the control of an electric vehicle or the like which is driven by power supplied from an aerial DC conductor. The present invention can also be applied to an apparatus for converting and controlling power supplied from such an aerial DC converter.

The inverter 4 receives DC power from the converter 2 and converts it to AC power to supply the AC power to the motor 7 driving the load unit 8.

This inverter 4 is controlled by the running control circuit 12 receiving a speed feedback signal 91 supplied from the encoder 9 and a running command 11 supplied from the outside and outputting a frequency command f* which designates a frequency of voltage to be supplied to the motor 7. The inverter 4 is also controlled by the inverter control circuit 15 which outputs a control signal $P_{INV}$ on the basis of the frequency command f*.

The running control circuit 12 outputs a current command I* as well, and the current control circuit 13 outputs a control deviation $E_i$ on the basis of the current command I* and a feedback current $I_{df}$ supplied from the current detector 10. On the basis of the control deviation Ei and a predetermined control function, the converter control circuit 14 generates control signals P201 to P204 to output them to the current-type converter 2.

The converter control circuit 14 includes a single chip microcomputer. The converter control circuit 14 receives the control deviation value Ei from the current control circuit 13. On the basis of conduction pulse widths $T_P$ and $T_R$ of an illustrated function varied depending upon the control deviation valve Ei, the converter control circuit 14 outputs the drive signals P201 to P204 corresponding to respective self-arc-suppressing devices 201 to 204 to drive respective self-arc-suppressing devices 201 to 204 of the converter 2. The single chip microcontroller included in the converter control circuit 14 has functions including computational processing, A-D conversion, D-A conversion, and schedule processing. If an arbitrary signal state and time when this signal is outputted are set in an associative memory, the signal state thus set is outputted to the outside as the specified time by the schedule processing function.

When a desired running command for the load 8 is inputted to the running command input terminal 11 from the outside, the running control circuit 12 issues a speed pattern on the basis of predetermined internal program. By using the above described speed pattern and the speed feedback signal 91, the running control circuit 12 performs vector computation and outputs the current command I* and the frequency command f*.

On the basis of the feedback current $I_{df}$ supplied from the current detector 10 and the current command I*, the current control circuit 13 derives a control deviation Ei for performing the constant current control and outputs it to the current-type converter control circuit 14.

The current-type converter control circuit 14 receives the above described control deviation Ei and generates the drive signals P201 to P204 for controlling the power conversion in the current-type converter 2.

Thereby the current-type converter 2 performs power conversion operation and vary the constant voltage of the battery 1 to output it. And the current-type converter 2 supplies the DC power transformed into the variable voltage form to the inverter 4 via the reactor 3.

On the other hand, the inverter control circuit 15 receives the frequency command f* and generates the drive signal $P_{INV}$ for controlling the inverter 4 in the PWM scheme. The inverter control circuit 15 thus controls self-arc-suppressing devices included in the inverter 4. Thereby, the inverter 4 converts the above described DC power to AC power and supplies AC power having a variable frequency depending upon the frequency command to the motor 7. The motor 7 is driven by the inverter 4 and since then controlled to have a variable speed in accordance with the speed pattern of the running control circuit 12.

Control of the power conversion operation of the converter 2 for converting the fixed voltage of the battery into a variable voltage will now be described.

The power conversion operation of the current-type converter is performed by controlling the converter to assume the following three circuit states in the control period of each of the powering control mode and the regenerative control mode:

(1) powering conduction state in which power is supplied from the battery 1 to the inverter 4;

(2) regenerative conduction state in which power from the inverter 4 is regenerated towered the battery 1; and (3) reflux state in which the DC circuit is short-circuited to return the circuit current (which is a DC current).

The duration of each of these three circuit states is defined by a control function as shown in FIG. 2A produced by the converter control circuit 14. The converter control circuit 14 causes the conversion control operation of respective self-arc-suppressing devices 201 to 204 so that the circuit state of the converter 2 may assume a predetermined state for a predetermined period.

In the control function shown in FIG. 2A, the abscissa represents the conduction ratio $\gamma^*(Ei)$ so converted that the maximum value and the minimum value of the control deviation value Ei will be 1 and $-1$, respectively.

Further, the conduction ratio $\gamma^*(Ei)$ is divided into the following two control modes.

The range represented as $0 \leq \gamma^*(Ei) \leq 1$ corresponds to the powering control mode in which the motor 7 is power-controlled by the power supplied from the battery 1. And the range represented as $-1 \leq \gamma^*(Ei) < 0$ corresponds to the regenerative control mode in which the motor is braked and controlled by the regenerative power supplied from the motor 7.

The ordinate represents the pulse widths of the drive signals causing the above described three circuit states. The illustrated $T_P$ represents the width of a powering conduction pulse causing the powering conduction state, and $T_R$ represents the width of a regenerative conduction pulse causing the regenerative conduction state.

Further, $T_C$ represents a conversion control period, and $T_{P(min)}$, $T_{R(min)}$, and $T_{F(min)}$, represent minimum values of pulse widths in the powering conduction state, the regenerative conduction state and the reflux state, respectively. The above described minimum values of pulse widths are so set as not to be shorter than the minimum pulse widths of the self-arc-suppressing devices.

Pulse widths shown in FIG. 2A have the following relations.

In the powering control mode having a conduction ratio represented as $\gamma^*(Ei) \geq 0$, the pulse width can be represented by the regenerative conduction pulse width $T_{R(min)}$ having a fixed length irrespective of the conduction ratio $\gamma^*(Ei)$, a powering conduction pulse width $T_P(=\gamma^*(Ei)\cdot T_C + T_{P(min)})$ obtained by adding the pulse width $T_{P(min)}$ having a fixed length to a value $\gamma^*(Ei)\cdot T_C$ which is in proportion to the conduction ratio $\gamma^*(Ei)$ and illustrated by a broken line, and a reflux pulse width $T_F(=T_C - T_P - T_{R(min)})$.

In the regenerative control mode having a conduction ratio represented as $\gamma^*(Ei) < 0$, the pulse width is represented as the powering conduction pulse $T_{P(min)}$ having fixed length, a regenerative conduction pulse width $T_R(=\gamma^*(Ei)\cdot T_C + T_{R(min)})$ obtained by adding the pulse width $T_{R(min)}$ having a fixed length to a value which is in proportion to the conduction ratio $\gamma^*(Ei)$, and the reflux pulse $T_F(=T_C - T_R - T_{P(min)})$.

In order to generate functions including the above described three pulses, the converter control circuit 14 receives the control deviation Ei and executes the following processing.

This processing will now be described by referring to a flow chart illustrated in FIG. 3.

(1) If this program is started at intervals of conversion control period $T_C$, the converter control circuit 14 takes in the control deviation value Ei from the current control circuit 13 and calculates the conduction ratio $\gamma^*(Ei)$ already described from the control deviation Ei (steps 140 to 142).

(2) A control mode is determined on the basis of the conduction ratio $\gamma^*(Ei)$. If $\gamma^*(Ei) \geq 0$, the processing of the powering mode beginning at step 1440 is executed. If $\gamma^*(Ei) \leq 0$, the processing of the regenerative control mode beginning at step 1450 is executed (step 143).

(3) In case of the powering control mode, the powering conduction pulse width $T_P = \gamma^*(Ei)\cdot T_C + T_{P(min)}$ as shown in FIG. 2A is derived, and it is checked whether this pulse width exceeds the limit value or not (steps 1440 and 1441). Since the conversion control period $T_C$ includes three pulses, the maximum value $T_{P(max)}$ of the powering conduction pulse width must satisfy $$T_{P(max)} = T_C - T_{R(min)} - T_{F(min)} \tag{1}$$

(4) $T_P$ is compared with $T_{P(max)}$. If $T_P > T_{P(max)}$, $T_P$ is replaced by $T_{P(max)}$, and the processing is advanced to schedule processing step 1461 (step 1442).

(5) In case of the regenerative control mode as well, the regenerative conduction pulse width $T_R = |\gamma^*(Ei)|\cdot T_C + T_{R(min)}$ having the relation as shown in FIG. 2A is calculated in the same way as the powering control mode. It is checked whether this pulse width exceeds the maximum pulse width $$T_{R(max)} = T_C - T_{P(min)} - T_{F(min)} \tag{2}$$

or not. If $T_R > T_{R(max)}$, $T_R$ is replaced by $T_{R(max)}$, and the processing is advanced to schedule processing step 1462 (steps 1450 to 1452).

(6) If the schedule processing step 1461 or 1462 has been finished, this program processing is completed. However, this program is started at intervals of the conversion control period $T_C$ and is repetitively executed.

The processing at schedule processing step 1461 in the powering control mode will now be described. At this processing step, the drive signals P201 to P204 respectively for driving the self-arc-suppressing devices 201 to 204 are scheduled as follows.

First of all, the drive signals P201 and P204 are turned into the "H" (the self-arc-suppressing devices are turned-on in a H state) state and the drive signal P202 and P203 are turned into the "L" (the self-arc-suppressing devices are turned-off in a L state) state at reference time $t_0$.

When the powering conduction pulse width $T_P$ calculated at step 1440 has elapsed since the reference time $t_0$, i.e., at $t_1 = t_0 + T_P$, the drive signals P202 and P203 are turned into the "H" state and the drive signals P201 and P204 are turned into the "L" state.

When the regenerative conduction pulse width $T_{R(min)}$ having a fixed length as shown in FIG. 2A has elapsed since the above described $t_1$, i.e., at $t_2 = t_1 + t_{R(min)}$, the drive signal P204 is turned into the "H" state, and the drive signal P203 is turned into the "L" state.

FIG. 4 shows a time chart of drive signals outputted by this schedule processing. By these drive signals, the current-type converter 2 assumes three circuit states described before as shown in FIGS. 5A, 5B and 5C.

FIG. 5A shows a circuit state obtained during a period ranging from $t_0$ to $t_1$. (This period corresponds to the powering conduction pulse width $T_P$.) During this period, the self-arc-suppressing devices 201 and 204 are in the on-state, and 202 and 203 are in the off-state. The battery 1 is thus connected to the inverter 4 via the reactor 3, resulting in the powering conduction state.

As shown in FIG. 4, therefore, the output voltage of converter $V_d$ during this period becomes $$V_d = E_B$$

where $E_B$ denotes the voltage of the battery 1.

FIG. 5B shows a circuit state obtained during a period ranging from $t_1$ to $t_2$ (This period corresponds to the regenerative conduction pulse width $T_{R(min)}$.) During this period, the self-arc-suppressing devices 202 and 203 are in the on-state, and 201 and 204 are in the off-state. Power from the inverter 4 is thus regenerated toward the battery 1, resulting in the regenerative conduction state.

As shown in FIG. 4, therefore, the output voltage $V_d$ during this period becomes $$V_d = -E_B$$

Further, FIG. 5C shows a circuit state obtained during a period ranging from $t_2$ to $t_3$ (This period corresponds to the reflux pulse width $T_F$. The time $t_3$ becomes the reference time $t_0$ of the next schedule processing.) During this perod, the self-arc-suppressing devices 203 and 204 are in the on-state, and 201 and 202 are in the off-state. The DC circuit is thus short-circuited and the DC current Id is returned, resulting in the reflux state.

As shown in FIG. 4, therefore, the output voltage $V_d$ during this period becomes
$V_d = 0$.

The above described three circuit states are generated for every conversion control period $T_C$. Accordingly, the average value $V_{da}$ of the output voltage within $T_C$ can be represented as $$V_{da} = \frac{T_P - T_{R(min)}}{T_C} \cdot E_B \tag{3}$$

where $T_P = \gamma^*(Ei) \cdot T_C + T_{P(min)}$.

If the voltage generated durin $T_{F(min)}$ and the voltage generated during $T_{P(min)}$ are equal each other in magnitude and opposite each other in polarity, the output voltage $V_{da}$ can be represented as $$V_{da} = \gamma^*(Ei) \cdot E_B \tag{4}$$

By settin $T_{R(min)}$ and $T_{P(min)}$ so that they may be equal each other in amount of voltage (i.e., magnitude × time), it is thus possible to continuously vary the output voltage $V_{da}$ in proportion to the conduction ratio $\gamma^*(Ei)$ from zero.

From equations (1) and (3), the maximum value $V_{da(max)}$ of the output voltage can be represented as $$V_{da(max)} = \frac{(T_C - T_{R(min)} - T_{F(min)}) - T_{R(min)}}{T_C} \cdot E_B \tag{5}$$
$$= \frac{T_C - 2 \cdot T_{R(min)} - T_{F(min)}}{T_C} \cdot E_B$$

The processing of the schedule processing step 1462 in the regenerative control mode will now be described. At this processing step, the drive signals P201 to P204 respectively for driving the self-arc-suppressing devices 201 to 204 are scheduled as follows.

First of all, the drive signals P202 and P203 are turned into "H" state, and P201 and P204 are turned into "L" state at reference time $t_0$. When the regenerative conduction pulse width $T_R$ calculated at step 1450 has elapsed since the reference time $t_0$, i.e., at time $t_1' = t_0 + T_R$, the drive signals P201 and P204 are turned into the "H" state, and P202 and P203 are turned into the "L" state. When the powering conduction pulse width $T_{P(min)}$ having a fixed length as shown in FIG. 2A has elapsed since the above described $t_1'$ i.e., at time $t_2'$ ($= t_1 + T_{P(min)}$), the drive signals P202 and P204 are turned into the "H" state and "L" state, respectively.

FIG. 6 shows a time chart of drive signals outputted by this schedule processing in the regenerative control mode and its output voltage characteristic diagram.

By these drive signals, the current-type converter 2 assumes three circuit states described before as shown in FIGS. 7A, 7B and 7C.

FIG. 7A shows a circuit state obtained during a period ranging from $t_0$ to $t_1'$. (This period corresponds to the regenerative conduction pulse width $T_R$.) During this period, the self-arc-suppressing devices 202 and 203 are in the on-state, and 201 and 204 are in the off-state. Accordingly, power from the inverter 4 is regenerated toward the battery, resulting in the regenerative conduction state.

As shown in FIG. 6, the Dc voltage $V_d$ during this period becomes $$V_d = -E_B.$$

FIG. 7B shows a circuit state obtained during a period ranging from $t_1'$ to $t_2'$. (This period corresponds to the powering conduction pulse width $T_{P(min)}$.) During this period, the self-arc-suppressing devices 201 and 204 are in the on-state, and 202 and 203 are in the off-state. Accordingly, the battery 1 is connected to the inverter 4 via the reactor 3, resulting in the powering conduction state.

As shown in FIG. 6, therefore, the DC voltage during this period becomes $$V_d = E_B.$$

Further, FIG. 7C shows a circuit state obtained during a period ranging from $t_2'$ to $t_3'$. (This period corresponds to the reflux pulse width $T_F$.) During this period, the self-arc-suppressing devices 201 and 202 are in the on-state, and 203 and 204 are in the off-state. Accordingly, the DC circuit is short-circuited and the DC current Id is returned, resulting in the reflux state.

As shown in FIG. 6, therefore, the output $V_d = 0$.

The above described three circuit states are generated for every conversion control period $T_C$. Accordingly, the output voltage $V_{da}$ within $T_C$ can be represented as $$V_{da} = \frac{T_R - T_{P(min)}}{T_C} \cdot (-E_B) \quad (6)$$

where $$T_R = |\gamma^*(Ei)| \cdot T_C + T_{R(min)}.$$

By setting $T_{R(min)}$ and $T_{P(min)}$ identically with those in the powering control mode ($\gamma^*(Ei) \geq 0$), voltage outputted by these two pulse widths are canceled each other. The output voltage $V_{da}$ can thus be represented as $$V_{da} = |\gamma^*(Ei)| \cdot (-E_B) \quad (7)$$

In the same way as the powering control, therefore, it is possible to continuously vary negative voltage in proportion to the conduction ratio $\gamma^*(Ei)$ from zero.

From equations (2) and (6), the maximum output voltage which can be outputted in this control mode becomes $$V_{da(max)} = \frac{(T_C - T_{P(min)} - T_{F(min)}) - T_{P(min)}}{T_C} \cdot (-E_B) \quad (8)$$

$$= \frac{T_C - 2 \cdot T_{P(min)} - T_{F(min)}}{T_C} \cdot (-E_B)$$

By the above described processing of the powering control mode and the regenerative control mode, it is possible to output the output voltage $V_{da}$ of the converter 2 while continuously varying it on the basis of the conduction ratio $\gamma^*(Ei)$ as shown in FIG. 2B in the range indicated by the above described equations (5) and (8). The inverter 4 receiving DC power having a voltage thus varied continuously in capable of controlling the motor 7 stably.

The control sequence of the above described three circuit states of the converter 2 need not be the sequence illustrated in FIGS. 5A, 5B and 5C or in FIGS. 7A, 7B and 7C, but may be any sequence. Further, the control of the reflux state is not limited to the methods illustrated in FIGS. 5C and 7C, but may be performed by using either one of methods illustrated in FIGS. 5C and 7C.

Further, the converter 2 may be controlled by the converter control circuit 14 in accordance with the following method which is another embodiment of the present invention. The control in this case will now be described by referring to drawings.

Figure 8A:
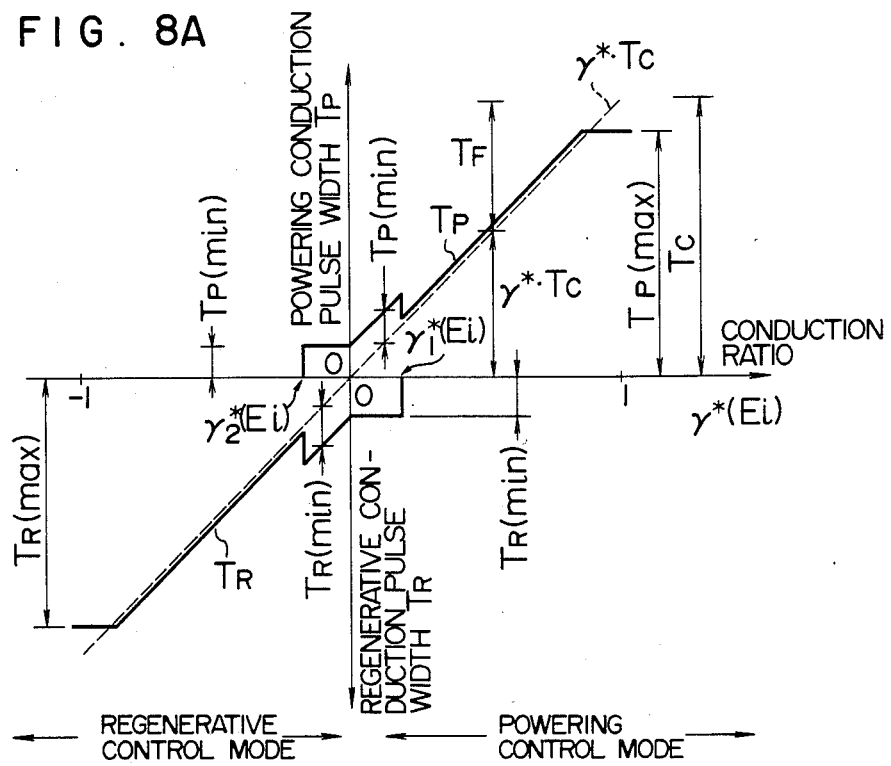
FIGS. 8A and 8B show a control function produced by the control circuit 14 for the purpose of control of another embodiment of the present invention and output voltage characteristics of the converter 2.
Figure 8B:
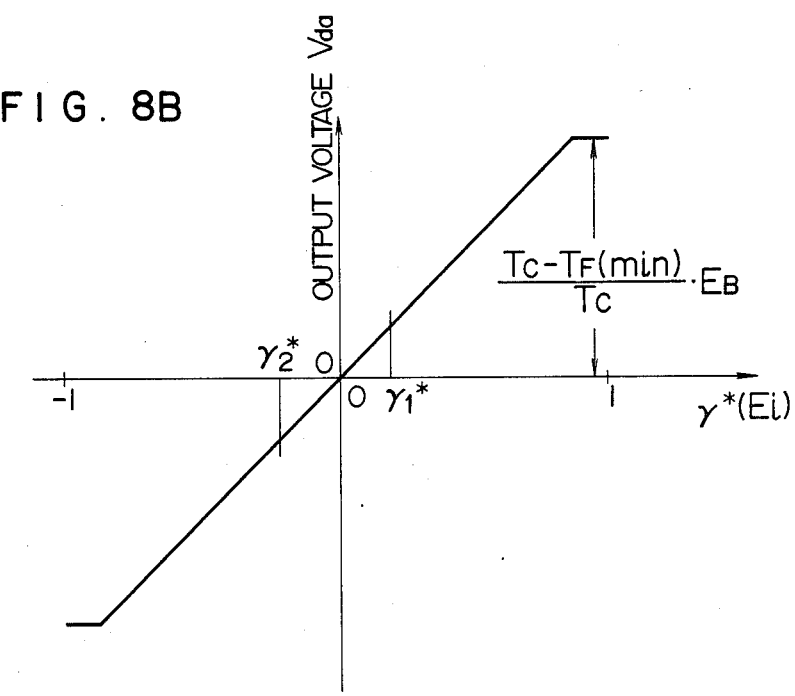
Figure 9:
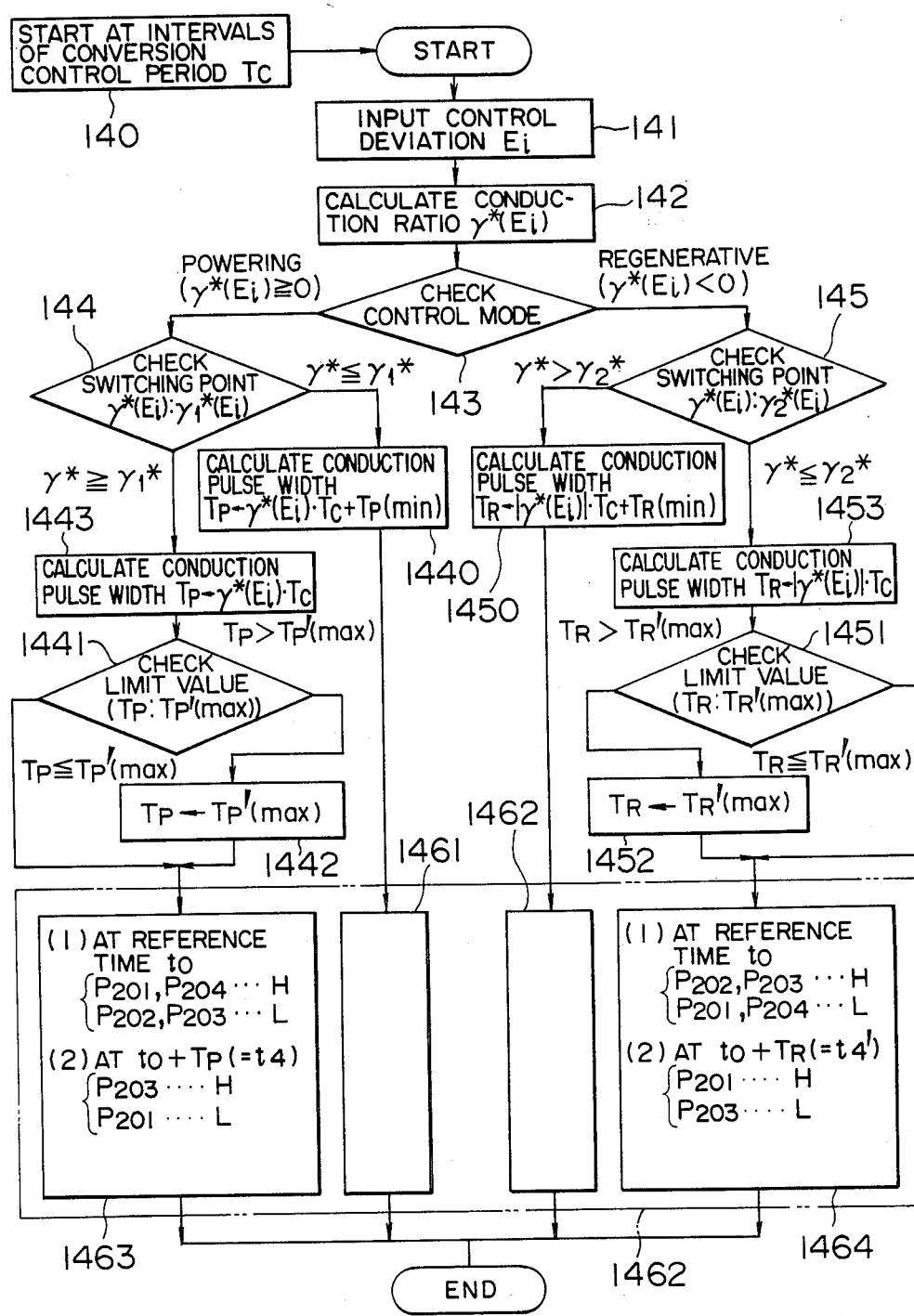
FIG. 9 shows the control flow chart of the control circuit 14 in that case.
Figure 10:
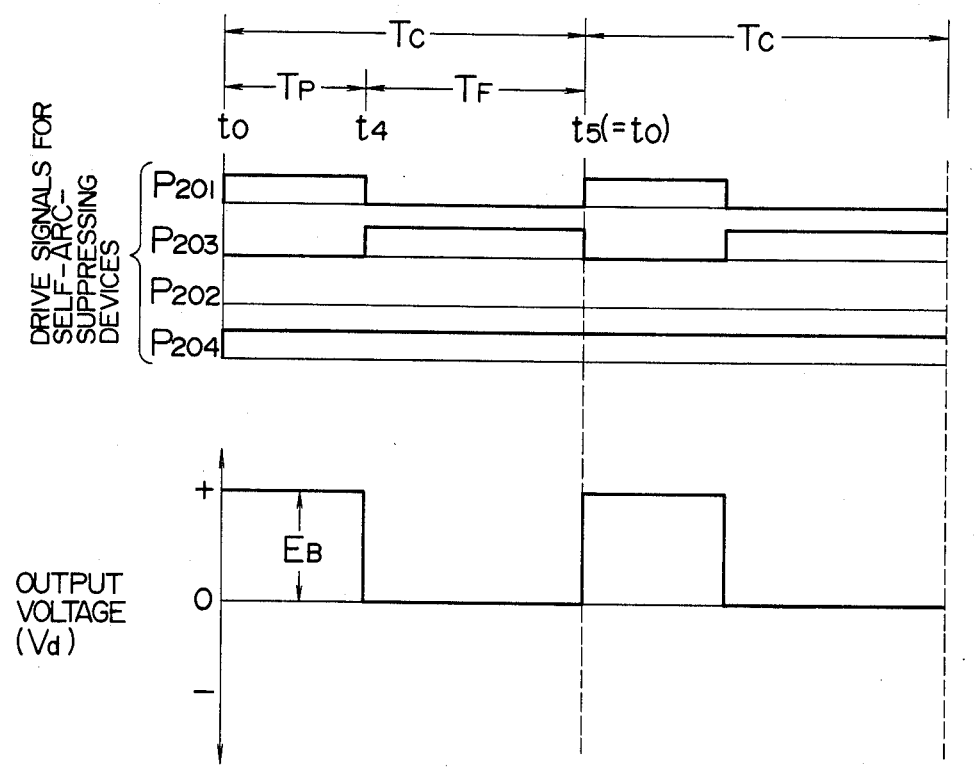
FIG. 10 shows a time chart of respective drive signals in powering control and its output voltage characteristics.
Figure 11:
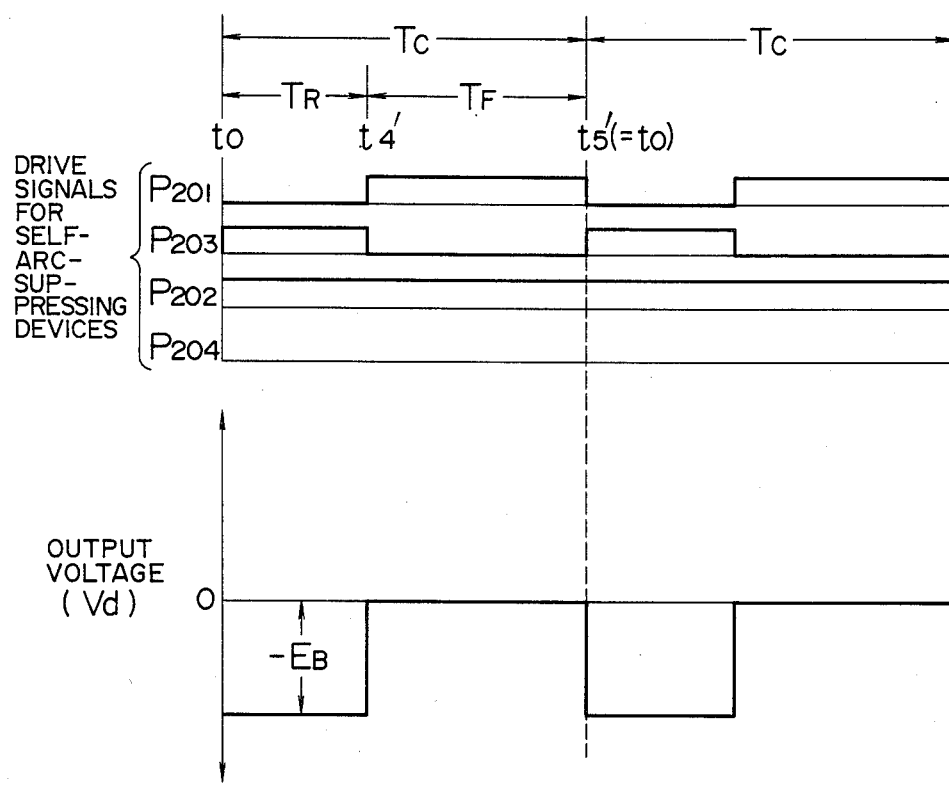
FIG. 11 shows a time chart of respective drive signals in regenerative control and its output voltage characteristics.

FIGS. 8A and 8B show a control function produced by the control circuit 14 and output voltage characteristics of the converter 2. FIG. 9 shows a control flow chart of the converter control circuit 14. FIG. 10 shows a time chart of drive signals in powering control and its output voltage. FIG. 11 shows a time chart of drive signals in regenerative control nnd its output voltage.

FIGS. 8A and 8B show a control function corresponding to FIG. 2A. The control function is produced by the converter control circuit 14. On the basis of this function, the control circuit 14 determines the pulse width of a drive signal. Within a preset range of conduction ratio of the control function illustrated in FIG. 8A, drive signals having the same pulse widths as those in case of the method illustrated in FIG. 2A are outputted to adjust the output voltage of the converter 2. Outside the above described preset range of conduction ratio, the output voltage is adjusted by only a pulse with the conduction pulse width for generating the canceling voltage removed.

In the range $\gamma^*(Ei) \geq 0$, it is understood from the relation indicated by equation (3) that the output voltage can be varied without $T_{P(min)}$ and $T_{R(min)}$ provided that the conduction ratio satisfies $$\gamma^*(Ei) \cdot T_C \geq T_{P(min)} \quad (9)$$

It is now assumed that a conduction ratio satisfying the relation in (9) is $\gamma_1^*(Ei)$. In the range $0 \leq \gamma^*(Ei) \leq \gamma_1^*(Ei)$, the converter 2 is controlled to assume three circuit states by pulses causing the above described three circuit states. In the range $\gamma^*(Ei) > \gamma_1^*(Ei)$, the circuit state of the converter 2 is controlled by only the powering conduction pulse and the reflux pulse.

For the range $\gamma^*(Ei) < 0$, it is similarly understood from equation (6) that the output voltage can be varied without $T_{P(min)}$ and $T_{R(min)}$ provided that the conduction ratio satisfies $$|\gamma^*(Ei)| \cdot T_C \geq T_{R(min)}. \quad (10)$$

It is now assumed that the conduction ratio satisfying the relation in 10) is $\gamma_2^*(Ei)$. In the range $0 > \gamma^*(Ei) \geq \gamma_2^*(Ei)$, the converter 2 is controlled to assume three circuit states by pulses causing the above described three circuit states. In the range $\gamma^*(Ei) < \gamma_2^*(Ei)$, the circuit state of the converter 2 is controlled by only the regenerative control pulse and the reflux pulse.

The converter control circuit 14 receives the control deviation value Ei and executes the following processing. This processing will now be described by referring to a flow chart shown in FIG. 9. However, the same processing as that shown in FIG. 3 will not be described.

In FIG. 9, the converter control circuit 14 executes processing as far as step 143 in the same way as FIG. 3. By the processing at step 143, the control mode is determined. Thereafter, processing is advanced to step 144 or 145 for checking the conversion control operation switching point in respective control modes.

If $\gamma^*(Ei) < \gamma_1^*(Ei)$ at step 144 or $\gamma^*(Ei) > \gamma_2^*(Ei)$ (; $\gamma^*(Ei) < 0$) at step 145, the powering conduction pulse width or regenerative conduction pulse width with the conduction pulse width having a fixed length added is calculated at step 1440 or 1450 in the same way as the embodiment shown in FIG. 1. Thereafter, schedule processing steps 1461 and 1462 are executed, respectively.

If $\gamma^*(Ei) \geq \gamma_1^*(Ei)$ at step 144, the powering conduction pulse width $T_P$ is calculated at step 1443. As evident from FIG. 8A, $T_P$ can be represented as $T_P = \gamma^*(Ei) \cdot T_C$.

Succeedingly, it is checked at step 1441 whether $T_P$ exceeds the limit value or not. Here, the maximum value $T'_{P(max)}$ of the conduction pulse width becomes $$T'_{P(max)} = T_C - T_{F(min)} \quad (11)$$

If $T_P > T'_{P(max)}$, therefore, $T_P$ is replaced by $T'_{P(max)}$ at step 1442, and processing is advanced to schedule processing step 1463.

If $\gamma^*(Ei) \leq \gamma_2^*(Ei)$ (; $\gamma^*(Ei) < 0$) at step 145, the regenerative conduction pulse width $T_R$ is calculated at step 1453. As evident from FIG. 8A, $T_R$ is represented as $$T_R = |\gamma^*(Ei)| \cdot T_C.$$

Succeedingly, it is checked at step 1451 whether the above described $T_P$ exceeds the limit value or not. In the same way as equation (11), the maximum value $T'_{R(max)}$ of the conduction pulse width becomes $$T'_{R(max)} = T_C - T_{F(min)}. \quad (12)$$

If $T_R > T'_{R(max)}$, $T_R$ is replaced by $T_{R(max)}$ and processing is advanced to schedule processing step 1264.

The structure of schedule processing performed at steps 1463 and 1464 and the circuit state produced by this schedule processing will now be described.

At schedule processing step 1463 of the powering control mode, the following drive signals for driving self-arc-suppressing devices 201 to 204 of the current-type converter 2 are scheduled.

First of all, drive signals P201 and P204 are turned into the "H" state and P202 and P203 are turned into the "L" state at reference time $t_0$.

When the powering control pulse width $T_P$ calculated at step 1443 has elapsed since the reference time $t_0$, i.e., at $t_4 = t_0 + T_P$, the drive signal P203 is turned into the "H" state and P201 is turned into the "L" state.

FIG. 10 shows a time chart of drive signals outputted by this schedule processing and its output voltage characteristic diagram.

By the drive signals, the current-type converter 2 assumes circuit states shown in FIGS. 5A and 5C, and output voltage as illustrated in FIG. 10 is generated.

Accordingly, the output voltage $V_{da}$ is represented as $$V_{da} = \frac{T_P}{T_C} \cdot E_B. \quad (13)$$

From equations (11) and (13), the maximum output voltage $V_{da(max)}$ can be represented as $$V_{da(max)} = \frac{T_C - T_{S(min)}}{T_C} \cdot E_B \quad (14)$$

On the other hand, drive signals are scheduled at schedule processing step 1464 in the regenerative control mode as described below.

First of all, the drive signals P202 and P203 are turned into the "H" state, and P201 and P204 are turned into the "L" state at reference time $t_0$.

When the regenerative conduction pulse width $T_R$ calculated at step 1453 has elapsed since the reference time $t_0$, i.e., at $t_4' = t_0 + T_R$, the drive signal P201 is turned into the "H" state and P203 is turned into the "L" state.

FIG. 11 shows a time chart of drive signals outputted by this schedule processing. Upon these drive signals, the current-type converter 2 assumes circuit states illustrated in FIGS. 7A and 7C, and the output voltage illustrated in FIG. 11 is generated.

Accordingly, the output voltage $V_{da}$ becomes $$V_{da} = \frac{T_R}{T_C} \cdot (-E_B). \quad (15)$$

From equations (12) and (15), the maximum value $V'_{da(max)}$ of the output voltage can be represented as $$V'_{da(max)} = \frac{T_C - T_{F(min)}}{T_C} \cdot (-E_B). \quad (16)$$

Owing to the above described processing, it is possible to continuously vary the output voltage $V_{da}$ of the current-type converter 2 within the range indicated by equations (14) and (16) even under the restriction of the minimum pulse width of self-arc-suppressing devices.

In the explanation of the above described embodiment, the motor controlled via the inverter 4 was used as the load of the converter 2 controlling the voltage supplied from the battery 1. However, the load of the converter 2 is not limited to the above described example, but may be any apparatus. When the load is a DC motor, it is a matter of course that the inverter 4 is not required.

Figure 12:
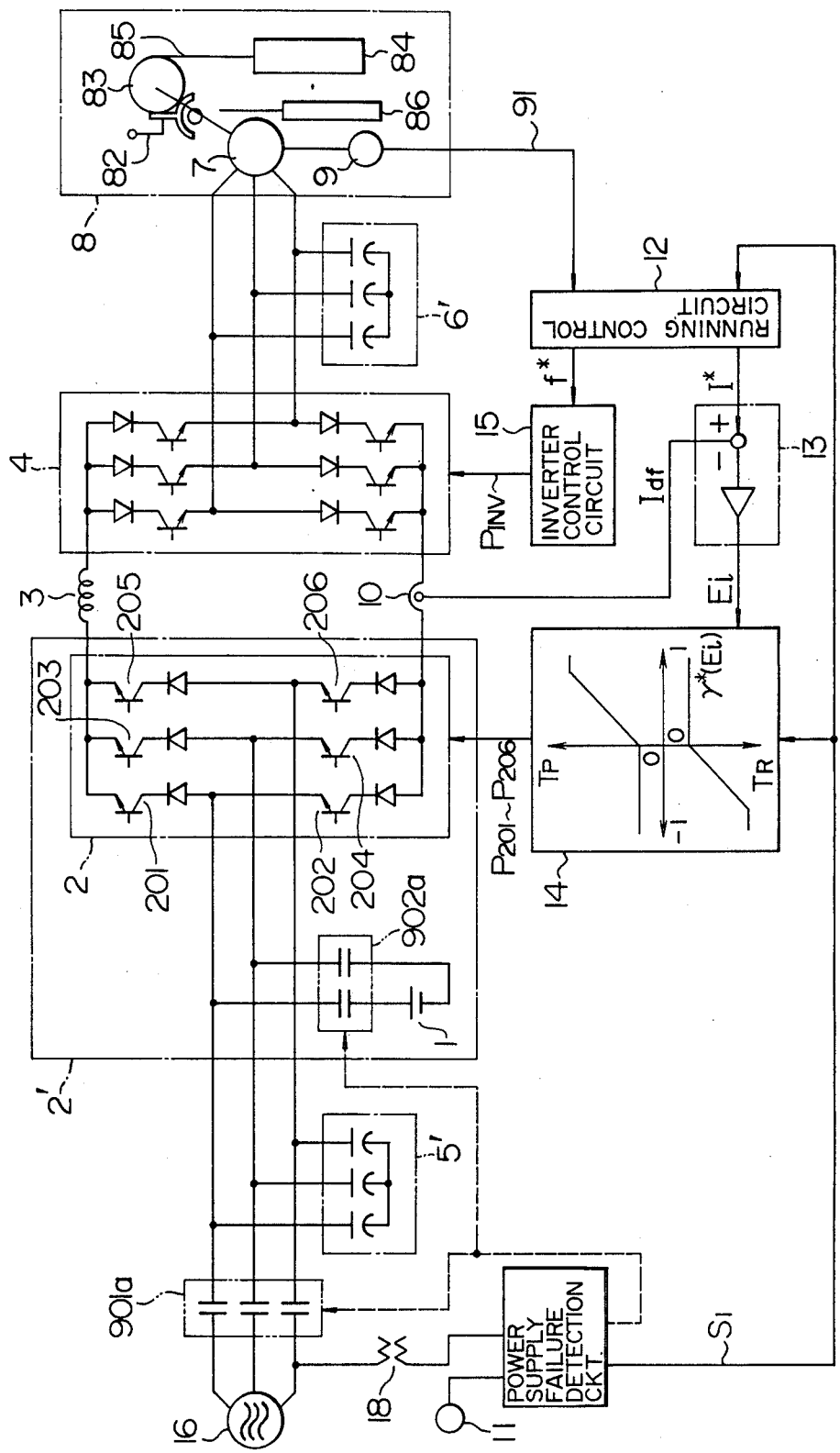
FIG. 12 is a circuit block diagram showing the entire configuration in case an embodiment of the present invention is used in a control unit of an elevator.
Figure 13:
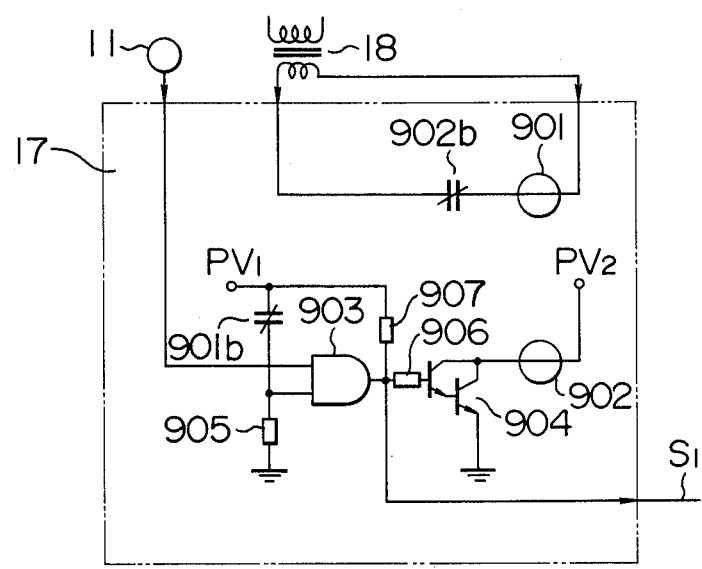
FIG. 13 is a configuration diagram of respective circuits of the embodiment shown in FIG. 12.

FIGS. 12 and 13 show an embodiment in case a current-type converter apparatus according to the present invention is used for control of an elevator upon failure of power supply.

In the embodiment of FIG. 12, a three-phase AC power source 16 and a power supply failure detection circuit 17 are newly added to the configuration of FIG. 1. A battery 1 is connected to the input of a current-type converter 2 via a contactor 902a of an electromagnetic relay. The above described three-phase AC power source 16 is also connected to the input side of the current-type converter 2 via a contactor 901a of an electromagnetic relay.

A power supply failure detection circuit 17 is connected to the three-phase AC power source 16 via a transformer 18. When the output of the three-phase AC power source 16 is present, the power supply failure detection circuit 17 closes the interval contactor 901a and opens the contactor 902a to supply three-phase AC power to the current-type converter.

When the power supply failure detection circuit 17 has detected the service interruption of the three-phase AC power source 16, the detection circuit 17 opens the above described internal contactor 901a and closes the other contactor 902a to supply DC power from the battery 1 to the current-type converter 2.

Unlike the embodiment of FIG. 1, the smoothing capacitor 5 and 6 are replaced by capacitors 5' and 6', each of which has three elements corresponding to three phases.

The current-type converter 2 includes six self-arc-suppressing devices 201 to 206 to perform a control in which a three-phase AC power source is employed as its input and six diodes connected for reverse voltage blocking. In the same way, the current-type inverter 4 includes six self-arc-suppressing devices and six diodes.

In normal running, the embodiment of FIG. 12 performs the power conversion control for a load 8 as a current-type inverter apparatus including the three-phase AC power source 16, the converter unit 2, and the inverter unit 4. Upon failure of power supply, the embodiment of FIG. 12 functions as a current-type converter apparatus which receives DC power from the battery 1 as the input and performs powering control and braking control of the load.

The configuration and operation of respective portions of the circuit illustrated in FIG. 12 will now be described in detail.

Numeral 8 denotes a load driven by the above described current-type inverter apparatus. The load 8 comprises drive mechanism of an elevator. Numeral 7 denotes a motor driven by AC power supplied from the above described current-type inverter unit 4. Numerals 82 and 83 denote an electromagnetic brake and a sheave coupled to the shaft of the motor. Numeral 84 denotes a cage of the elevator. The box 84 and a balancing weight 86 are suspended like well-buckets via rope 85 wound around the sheave 83. Numeral 9 denotes an encoder interlocked with the motor 7 to detect the speed of the elevator and the position of the cage.

Numeral 17 denotes a power supply failure detection circuit for detecting the service interruption of the AC power source 16 and generating a power supply failure running signal $S_1$. FIG. 13 shows the configuration of the power supply failure detection circuit 17.

The circuit of FIG. 13 is supplied with the voltage of the AC power source 16 via a transformer 18. And the circuit has a running command input terminal 11 through which the running command of the elevator is inputted. Numerals 901 and 902 denote electromagnetic relays, 901b and 902b b contacts of said electromagnetic relays, 903 an AND gate (open-collector type), 904 a transistor for driving the electromagnetic relay 902, and numerals 905 to 907 denote resistors.

Numeral 12 denotes a running control circuit for controlling the running of the elevator The running control circuit 12 is supplied with a speed feedback signal 91 of the encoder 9 and the power supply failure running signal $S_1$. Numeral 13 denotes a current control circuit. The current control circuit 13 receives a current command I* so computed as vectors in the above described running control circuit 12 as to direct a current to be supplied to the motor 7. The current control circuit 13 receives a feedback current $I_{df}$ from a current detector 10 as well. And the current control circuit 13 outputs the control deviation $E_i$. Numeral 14 denotes a converter control circuit for driving self-arc-suppressing devices 201 to 206 of a current-type converter unit 2. When a power supply failure running signal $S_1$ has been issued, the converter control circuit 14 generates drive signals P201 to P206 for driving self-arc-suppressing devices 201 to 206 in accordance with illustrated conduction characteristics with respect to the control deviation E . (The drive signals P201 to P206 correspond to the self-arc-suppressing devices 201 to 206, respectively.)

Numeral 15 denotes an inverter control circuit for driving respective self-arc-suppressing devices of the current-type inverter 4. On the basis of a frequency command f* obtained as a result of vector computation performed in the running control circuit 12, the inverter control circuit 15 generates a signal $P_{INV}$ for driving respective self-arc-suppressing devices of the current-type inverter 4.

In the same way as the embodiment of FIG. 1, each of the control circuits includes a single chip microcontroller.

If the AC power source 1 is in the conduction state in the above described configuration, the electromagnetic relay 901 of the power supply failure detector 17 shown in FIG. 13 is in the on-state, and the electromagnetic relay 902 is in the off-state. Further, the power supply failure running signal $S_1$ is not generated ($S_1$="L"). Accordingly, only the contactor 901a is closed to connect the AC source 16 to the current-type converter 2. Under this state, the normal running of the elevator is possible, and the elevator is run as follows.

When a start signal is inputted from the outside (not illustrated), the running control circuit 12 generates a predetermined speed pattern. From this speed pattern and the speed feedback signal 91, the running control circuit 12 forms a speed control system and applies vector computation thereto to generate the current command I* which directs the amount of current to be supplied to the motor 7.

On the basis of the phase characteristics and conduction characteristics (not shown) corresponding to the control deviation Ei, the converter control circuit calculates a PWM control signal and generates the drive signals P201 to P206.

As a result, the current-type converter 2 converts the AC power of the AC power source 1 to DC power and vary the DC current in accordance with the current command I*.

The running control circuit 12 outputs the frequency command f*, which is obtained by vector computation and which indicates the elevator speed, to the inverter control circuit 15. On the basis of the above described frequency command f*, the inverter control circuit 15 calculates a PWM control signal and generates the signal $P_{INV}$ for driving respective self-arc-suppressing devices of the current-type inverter 4. Thereby the current-type inverter 4 converts DC power supplied from the current-type converter to AC power and varies the frequency in accordance with the above described frequency command f*. The frequency thus varied is supplied to the motor 7. Accordingly, the motor 7 is driven and an elevator cage 84 interlocked therewith travels.

Under normal conditions, the power source, and the elevator is run on the basis of the current command and the frequency command supplied from the running control circuit.

Further, the elevator is so designed that the cage 84 loaded with approximately half the rating representing the maximum mountable load may balance with the balancing weight 86. Depending upon the amount of load mounted on the cage 84 and the running direction, the motor 7 may be reversely driven. At this time, the motor assumes the power generation state. Regenerative power is thus generated in the current-type converter 2 via the current-type inverter 4. In this case, the current-type converter 2 is driven by a PWM signal which differs in phase from the AC power source 16 by 180° in order to let flow a DC current Id depending upon the current command I*.

As a result, power from the motor 7 can be regenerated toward the AC power source 16. The motor 7 thus undergoes regenerative braking control.

Should the failure of power supply occur during the traveling of the elevator, the electromagnetic brake 82 is applied by a signal which is not illustrated and the elevator is stopped. At the same time, the electromagnetic relay 901 of the power supply failure detector 17 turns off. Accordingly, the contactor 901a of the electromagnetic relay 901 is opened to disconnect the AC power source 16 from the current-type converter 2.

If the cage 84 of the stopped elevator is located between floors at this time, the running command is inputted from a cage position detector (not illustrated) to the running command input terminal 11.

Therefore, one input of the AND gate 903 of the power supply failure detector 17 is runned into the "H" state. Since the above described electromagnetic relay 901 turns off by the power supply failure and its contact 901b is closed, the other input of the AND gate 903 is turned into the "H" state.

Therefore, the output of the AND gate 903 assumes the "H" state, and the electromagnetic relay 902 is turned on by the transistor 904. At the same time, the power supply failure running signal $S_1$ is also generated ($S_1$="H"). By the turning-on of the electromagnetic relay 902, its contactor 902a is closed to connect the battery 1 to the AC side input of the current-type converter 2. As a result, the battery 1 and the current-type converter 2 constitute a circuit 2' for performing power supply and regenerative braking upon failure of power supply.

Under this state, the running control circuit 12 receives the power supply failure running signal $S_1$ and produces a speed pattern for running during the failure of power supply. By using this speed pattern and the speed feedback signal 91, the running control circuit 12 performs vector computation and outputs the frequency command f* and the current command I*.

In the same way as the normal running, the inverter control circuit 15 calculates a PWM signal in accordance with the above described frequency command f* and generates a PWM control signal $P_{INV}$ for driving respective self-arc-suppressing devices of the current-type inverter 4.

On the other hand, the converter control circuit 14 performs a routine as shown in FIG. 3 according to the power supply failure running signal $S_1$. While, drive signals of the self-arc-suppressing devices P205, P206 are always remained unchanged in the "L" state.

It is thus possible to control the speed in accordance with the driving state of the motor. As a result, the elevator is rapidly run to a floor entrance through which passengers can go in and out.

Connection of the battery 1 is not limited to that of the embodiment shown in FIG. 12. The battery 1 may be connected between any phases among three phase inputs of the current-type converter. In this case, the operation pattern of self-arc-suppressing devices is so configured that the powering and regenerative conversion control operation using the conduction state and the reflux state as described in the embodiment may be performed.

Further, the circuit state during reflux is not limited to that of the embodiment. Any one of self-arc-suppressing devices need only be driven to be turned on so as to short-circuit the DC circuit.

The converter control circuit 14 can employ not only the control function shown in FIG. 2A (a processing according to the flowchart in FIG. 3) but also the control function shown in FIG. 8A (a processing according to the flowchart in FIG. 9).

In the powering control mode and in the regenerative control mode, it is also capable of driving the converter 2 to carry out the chopping operation only in the region above the minimum pulse width as described hereinafter to regulate the output voltage. That is, in the powering control mode, the converter 2 is controlled to carry out the chopping control according to a drive signal of the self-arc-suppressing device shown in FIG. 10. And in the regeneration control mode, the converter 2 is controlled to carry out the chopping control according to a drive signal of self-arc-suppressing device shown in FIG. 11. In above said manner, each output voltage is properly regulated.

In the present embodiment heretofore described, the battery 1 is connected to the input of the current-type converter 2 upon failure of power supply and respective self-arc-suppressing devices of the above described current-type converter 2 are so activated as to cause the powering and regenerative conversion control operation, power supply to the motor 7 and especially power regeneration from the motor 7 being attained.

As a result, braking control can be done even in the failure of power supply. Irrespective of the amount of load of the elevator cage, therefore, speed control of the elevator can be effected in the same way as the normal running.

FIG. 20 shows another embodiment of the present invention having circuit configuration similar to that of FIG. 12. The same components as those of FIG. 12 are denoted by identical numerals and will not be described here.

In FIG. 20, numeral 2,000 denotes a power supply and regenerative braking circuit for controlling the supply of power by means of the battery 1 and the current-type converter 2 and for controlling the regenerative power by means of a resistor 22 and the above described current-type inverter.

The above described circuit is so configured that braking control may be effected by dissipating power in the resistor when regenerative power is generated.

The reason why braking control is effected by dissipating the regenerative power in the resistor is as follows.

During the failure of power supply, an elevator is usually run in the light load direction (i.e., upward for a range from no load to a balanced load, and downward for the balanced load). Therefore, the battery need only have a capacity sufficient for supplying power to drive the elevator near the balanced load. In the full load descent with a load near the maximum mountable load, for example, large power is regenerated from the motor. Therefore, a battery having a capacity larger than that required for powering control must be installed.

During the power regeneration, therefore, braking control of the motor is performed by dissipating the regenerative power in the resistor. As a result, the capacity of the battery 1 can be made small to the utmost.

In this case, the current-type converter control circuit 14 performs the processing to drive self-arc-suppressing devices 201–206 so as to generate the voltage characteristic shown in FIGS. 4, 6, 10 and 11.

Figure 15:
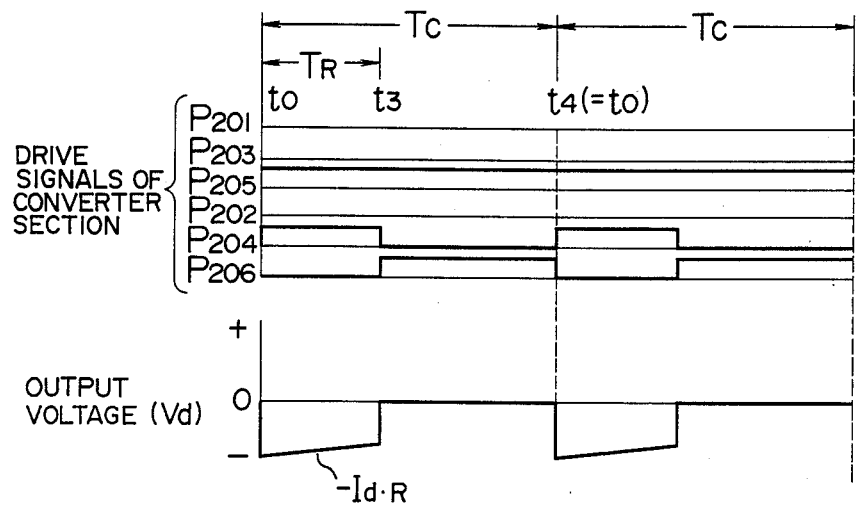

For example, the regenerative mode corresponding to FIG. 11 in which an output voltage is generated is described hereinafter according to FIG. 15.

At reference time $t_0$, P204 and P205 are turned to "H" while P201, P202, P203 and P206 are turned to "L".

When the conduction pulse width $T\gamma$ (where $t_3 = t_0 + |\gamma^*| \cdot T_C$) has elapsed since the above described reference time $t_0$, P206 is turned to "H" and P204 is turned to "L".

Figure 16A:
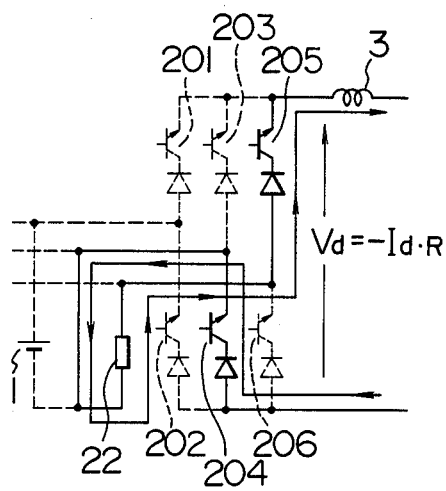
Figure 16B:
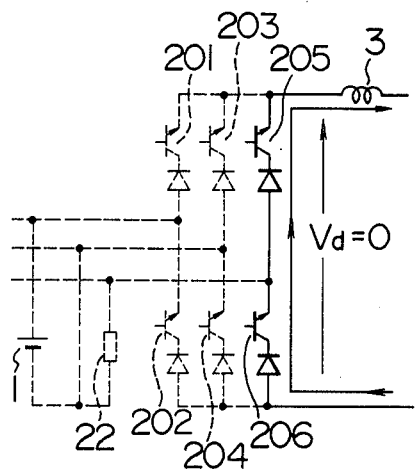

By these drive signals, the current-type converter 2 assumes circuit states as shown in FIGS. 16A and 16B.

FIG. 16A shows the circuit state formed during a period ranging from $t_0$ to $t_3$. During this period, self-arc-suppressing devices 204 and 205 are in the on-state, while the remaining devices are in the off-state. Accordingly, a resistor 22 is connected to the DC circuit, and the DC circuit voltage $V_d$ can be represented as $$V_d = -Id \cdot R$$

where R denotes the resistance value of the resistor 22.

FIG. 16B shows the circuit state of a period ranging from t3 to t4, where t4 corresponds to the reference time t0. During this period, the self-arc-suppressing device 205 remains on. The self-arc-suppressing device 206 is in the on-state and 204 is in the off-state. Because of the resultant reflux state, the DC voltage $V_d$ becomes $V_d = 0$.

The average value of the DC voltage over the conversion control period $T_C$ can be represented as $$V_{da} = -\frac{T_\gamma}{T_C} \cdot Id \cdot R$$

where $T\gamma = |\gamma^*| \cdot T_C$. The average value can be varied in accordance with the conduction ratio $\gamma^*$.

In the above-described configuration, the regenerative power supplied from the motor is dissipated in the resistor and the amount of dissipation is varied depending upon the conduction ratio $\gamma^*$, resulting in the regenerative braking control.

Figure 17:
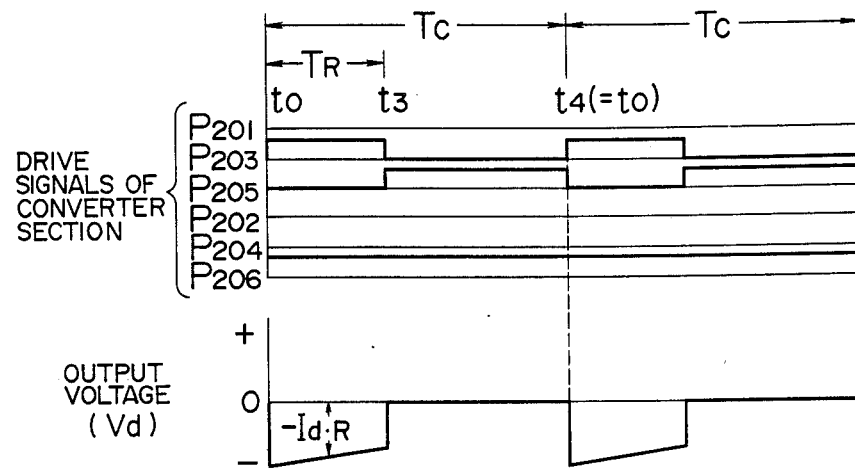

For the connection method of the resistor 22 shown in FIG. 20, the schedule processing is so configured as to output drive signals as shown in FIG. 17. The circuit states in this case are shown in FIGS. 18A and 18B.

Figure 18A:
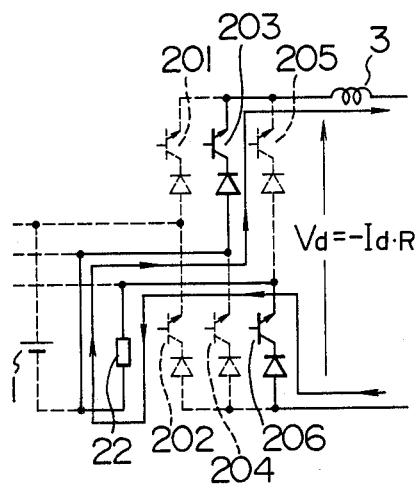
Figure 18B:
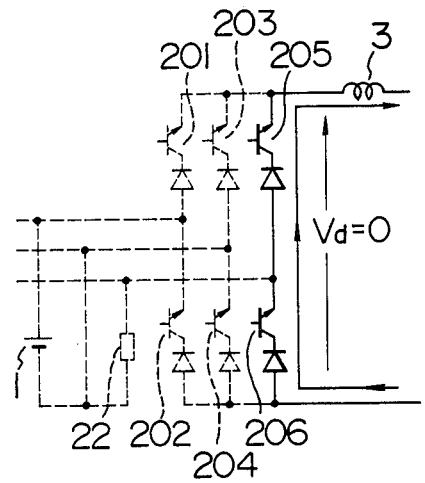

FIG. 18A shows the conduction state for the resistor obtained by turning on the self-arc-suppressing devices 203 and 206. FIG. 18B shows the reflux state obtained by turning on the self-arc-suppressing devices 205 and 206. As shown in FIG. 17, the DC circuit voltage outputted by these two circuit states is the same as that of FIG. 15.

Figure 14:
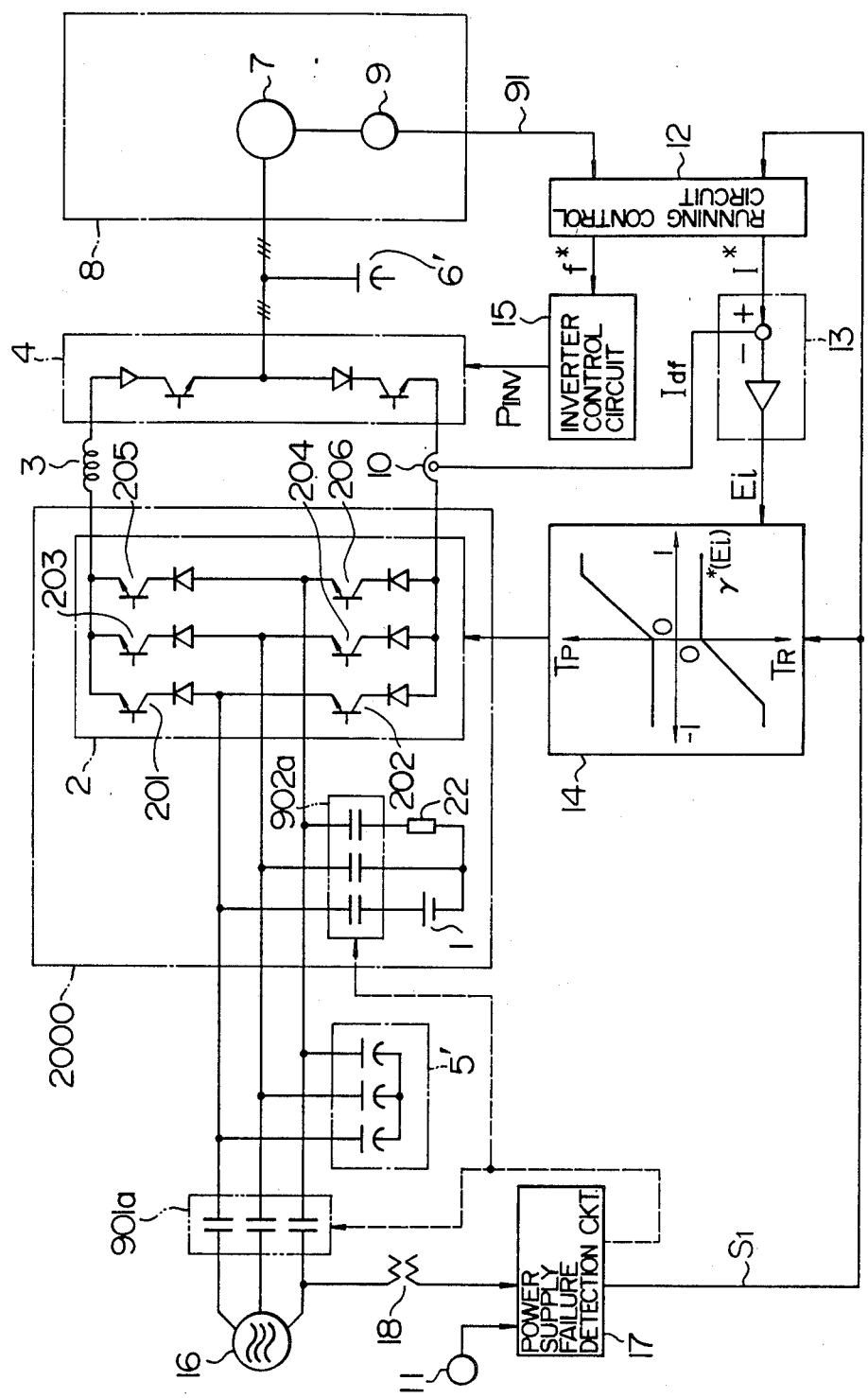
FIGS. 14 to 34 show other embodiments of the present invention.
Figure 19:
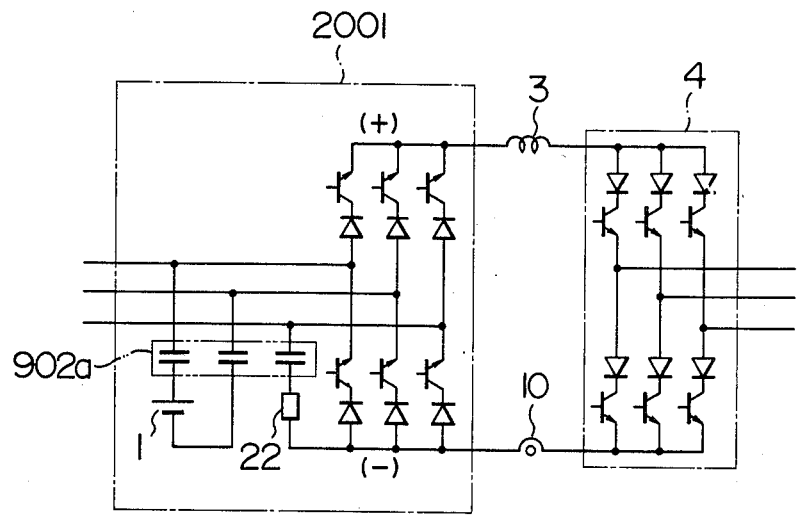
Figure 21:
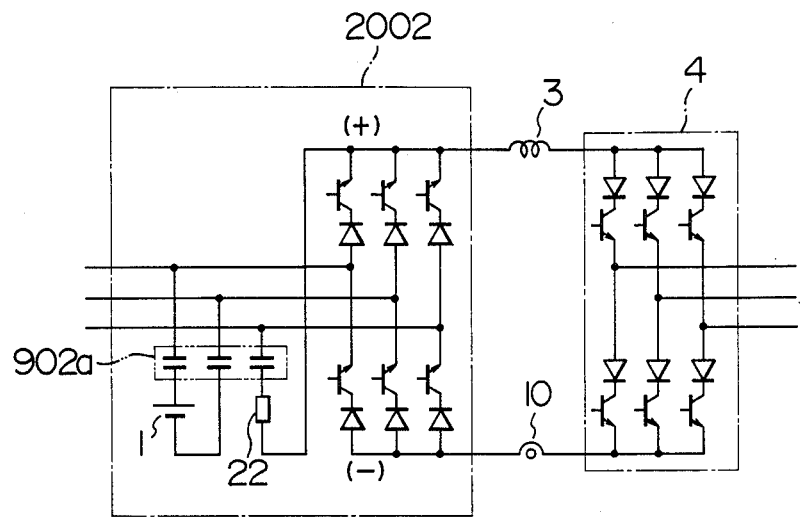

Further, the connection method of the resistor 22 is not limited to that of FIG. 14, but the connection shown in FIGS. 19 and 21 may be used.

The circuit shown in FIG. 19 includes a power supply and regenerative braking circuit 2001. In the circuit 2001, the resistor 22 is connected between an AC input of the current-type converter 2 and (−) of the DC output via a contactor 902a closed during the power supply failure running.

Figure 20A:
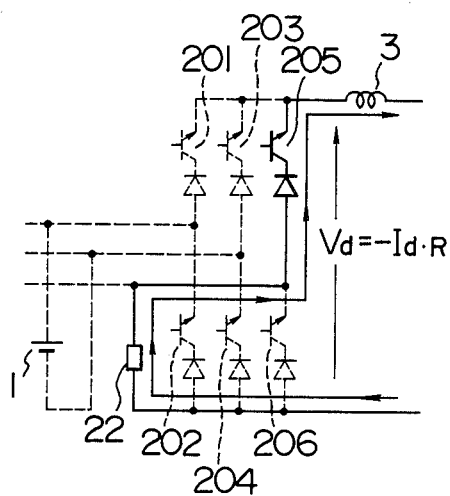
Figure 20B:
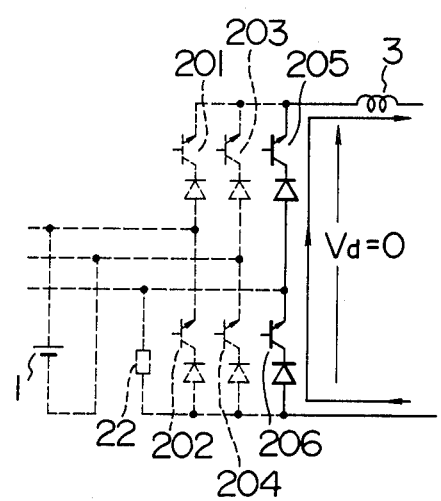

In this case, regenerative control is attained by performing the schedule processing so as to establish circuit states as shown in FIGS. 20A and 20B.

FIG. 20A shows the circuit state formed during the conduction period. During this period, only the self-arc-suppressing device 205 is turned on. FIG. 20B shows the circuit state formed during the reflux period. During the reflux period, the self-arc-suppressing devices 205 and 206 are turned on.

The circuit shown in FIG. 21 includes a power supply and regenerative braking circuit 2002. In the circuit 2002, the resistor 22 is connected between an AC input of the current-type converter 2 and (+) of the DC output via a contactor 902a closed upon the failure of power supply.

Figure 22A:
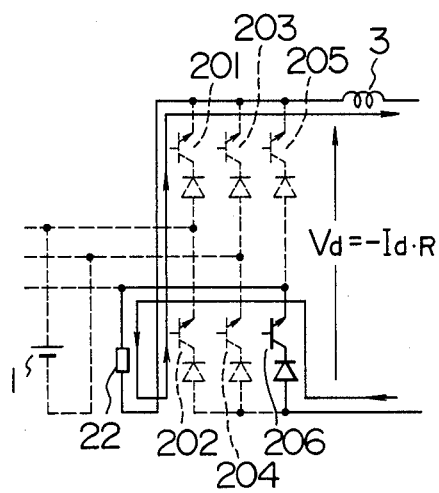
Figure 22B:
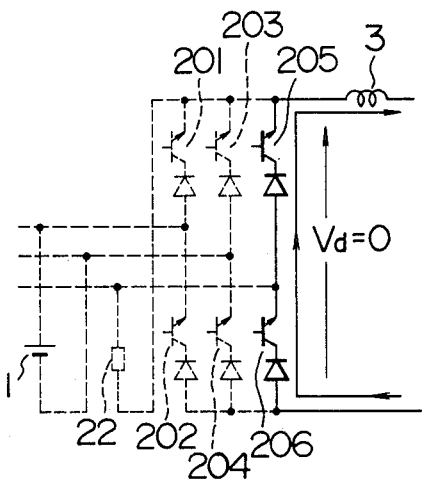

In this case, regenerative control is attained by performing the schedule processing so as to establish circuit states as shown in FIGS. 22A and 22B.

FIG. 22A shows the circuit state formed during the conduction period. During this period, the self-arc-suppressing device 206 is turned on. FIG. 22B shows the circuit state formed during the reflux period. During the reflux period, the self-arc-suppressing devices 205 and 206 are turned on.

Figure 23:
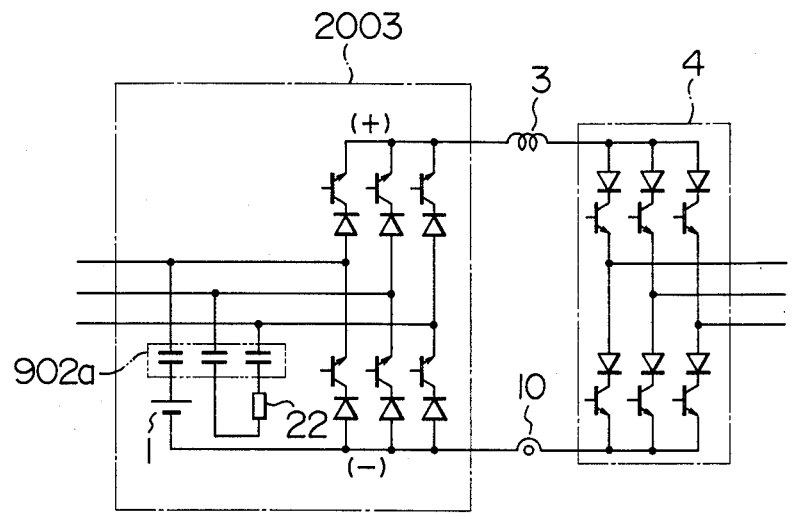
Figure 25:
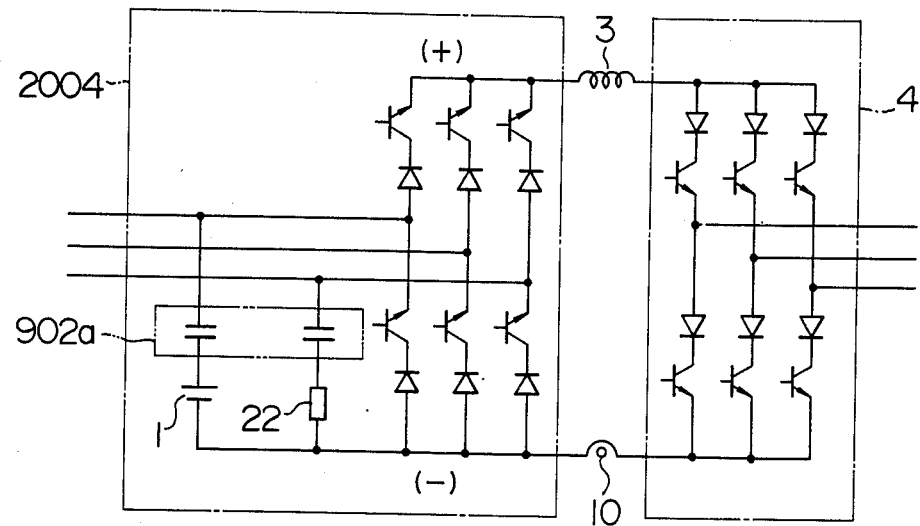
Figure 26:
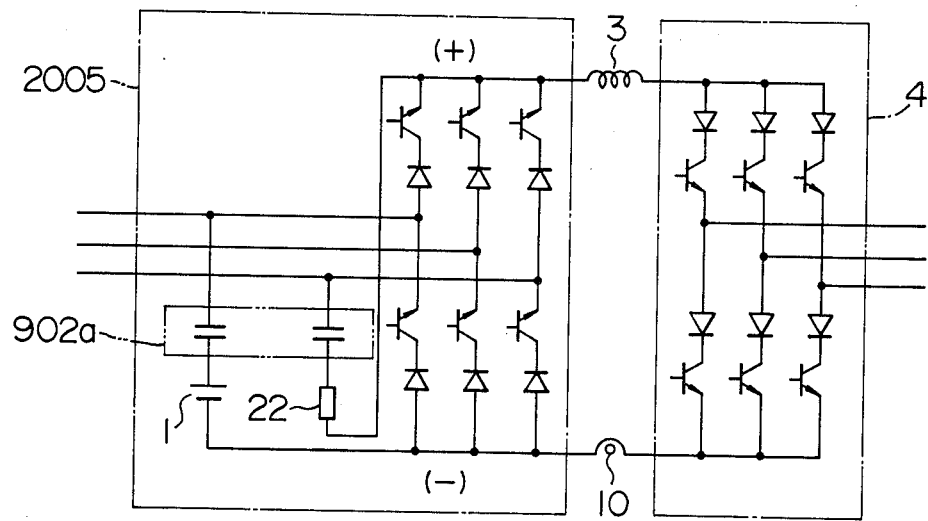

Braking control can be done by dissipating the regenerative power supplied from the motor in the resistor. Therefore, power supply and regenerative braking means 2003 to 2005 respectively shown in FIGS. 23, 25 and 26 may be used, in FIGS. 23, 25 and 26, the battery 1 is connected between an AC input of the current-type converter 2 and a DC output (−) via the contactor 902a closed during the power supply failure running.

Figure 24A:
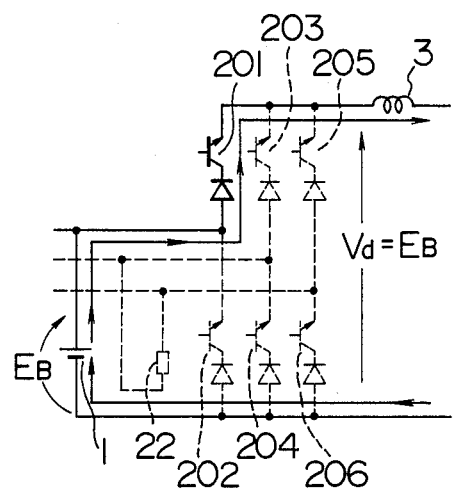
Figure 24B:
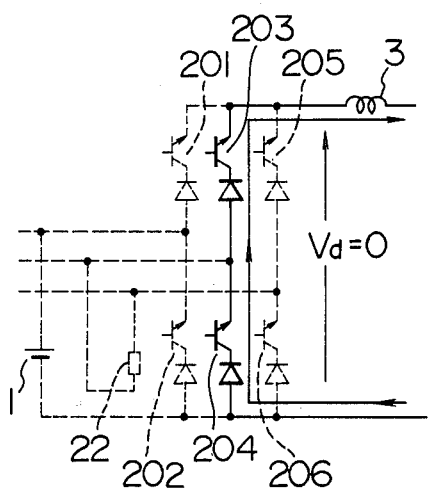

In this case, powering control is attained by performing the schedule processing so as to establish circuit states as shown in FIGS. 24A and 24B.

FIG. 29A shows the circuit state formed during the conduction period. During this period, the self-arc-suppressing device 201 is turned on. FIG. 24B shows the circuit state formed during the reflux period. During the reflux period, the self-arc-suppressing devices 203 and 204 are turned on.

The connection of the battery 1 and the resistor 22 inserted into the AC side of the current-type inverter 2 is not limited to that shown in FIG. 14. Both terminals or one terminal may be connected between any phases or to any phase among three-phase AC inputs.

In this case, the self-arc-suppressing devices may be driven by such schedule processing as to cause powering and regenerative conversion control operation having the conduction period and the reflux period.

Figure 27:
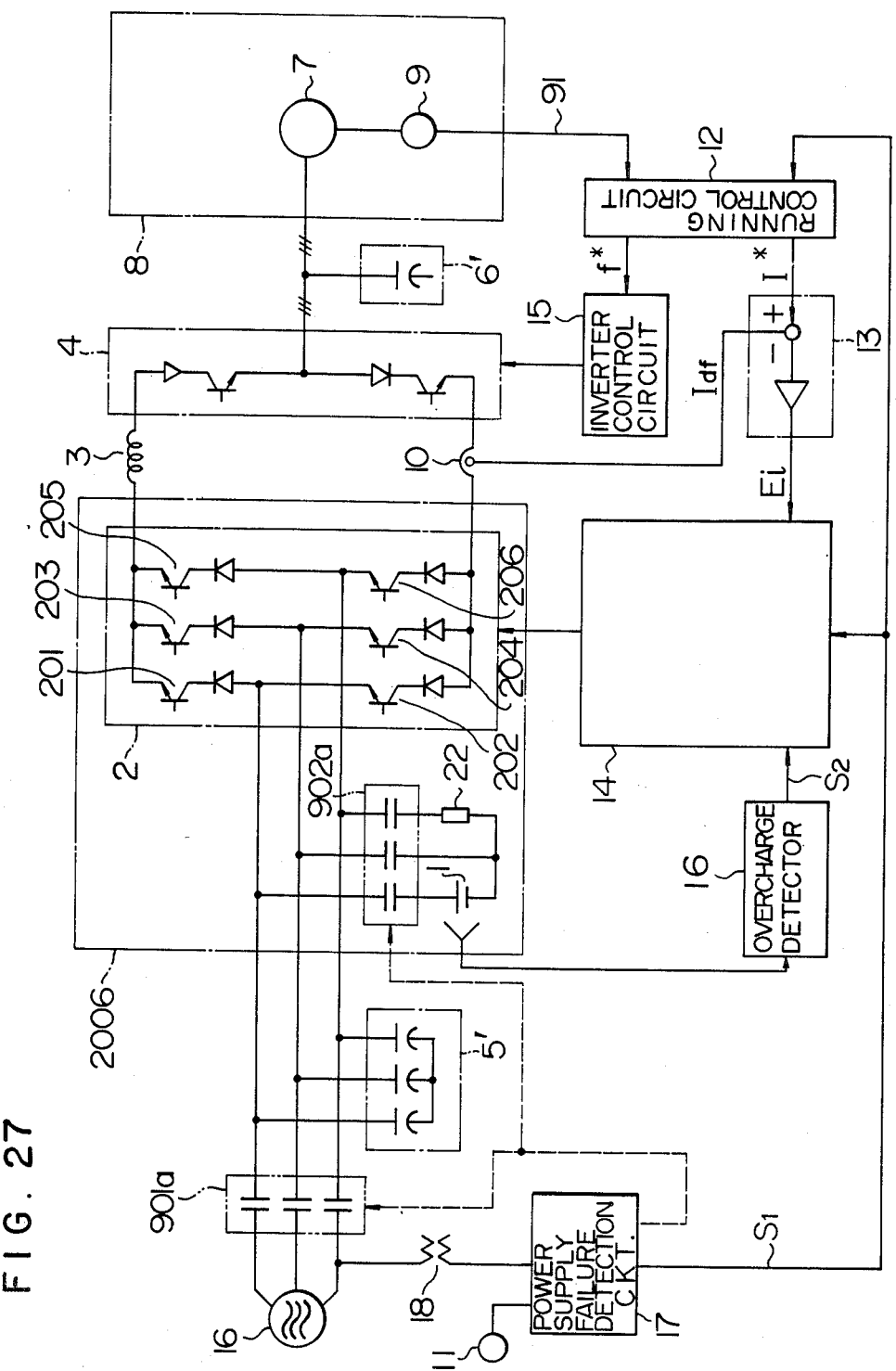

FIG. 27 shows a further embodiment of the present invention having circuit configuration corresponding to that of FIG. 12. The same components as those of FIG. 12 are denoted by identical numerals and will not be described here.

In FIG. 27, numeral 2006 denotes a power supply and regenerative braking circuit. In the circuit 2006, the battery 1 and the resistor 22 are connected to AC input of the current-type converter 2 via the contactor 902a which is closed when the power supply failure running command is issued. Numeral 19 denotes an overcharge detector for monitoring the voltage of the battery 1 and outputting an overcharge signal $S_2$ (where $S_2$="H") to the converter control circuit 14 upon overcharge.

In this case, the converter control circuit 14 performs the following processing to drive respective self-arc-suppressing devices 201 to 206 of the current-type converter 2. The processing will now be described by referring to a flow chart shown in FIG. 28.

Figure 28:
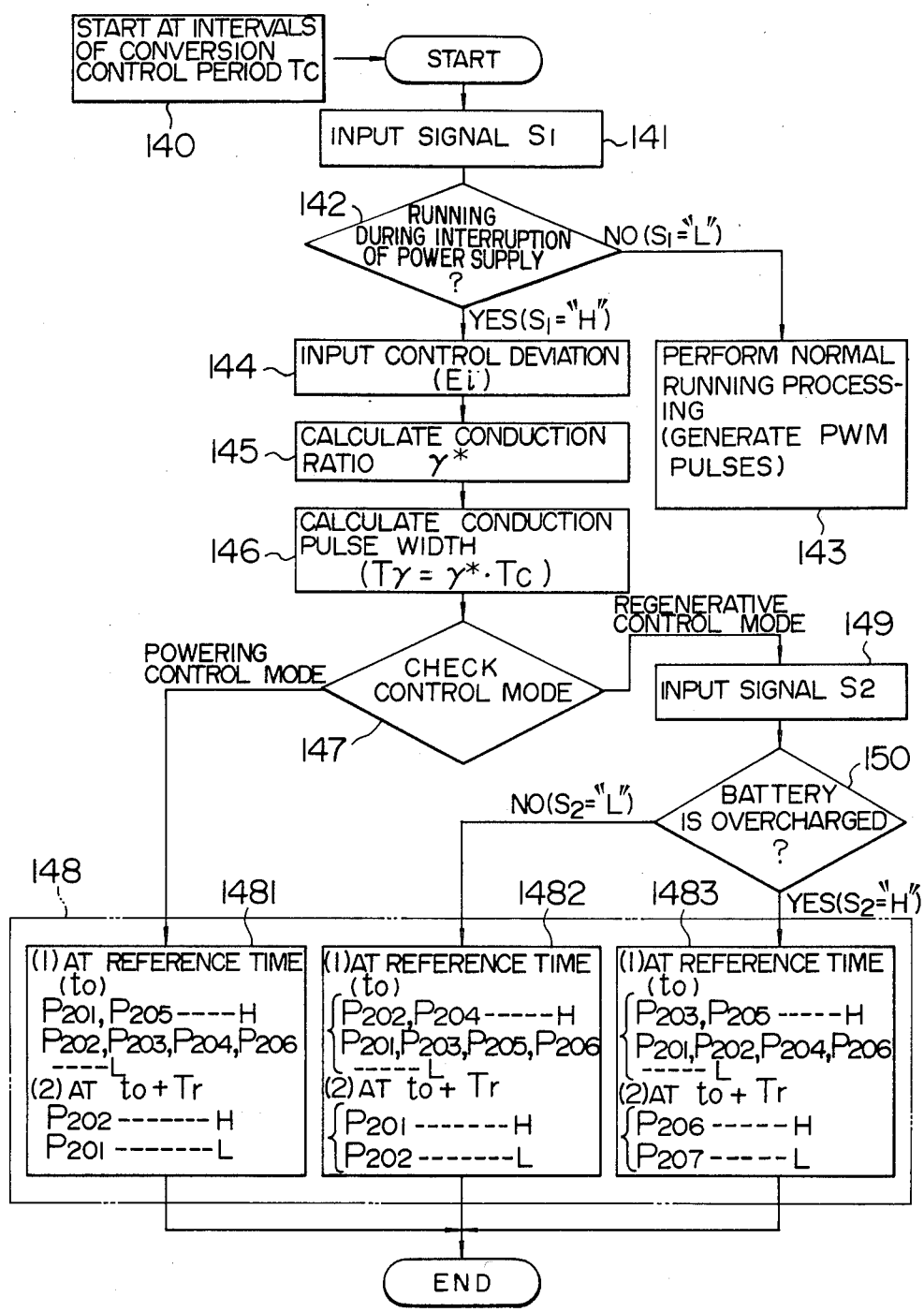

In FIG. 28, the schedule processing in the regenerative control mode includes schedule processing step 1482 for regenerating power toward the battery and schedule processing step 1483 for regenerating power toward the resistor.

The schedule processing is changed over as follows. If the result of control mode check performed at step 147 is the regenerative control mode, the overcharge signal $S_2$ of the overcharge detector 19 is inputted at step 149. It is judged at step 150 whether the overcharge signal $S_2$ indicates the overcharge state or not.

In the above described configuration, power regeneration to the battery 1 is performed when the battery 1 is not in the overcharge state (i.e., $S_1$="L"). When the battery 1 is in the overcharge state (i.e., $S_2$="H"), the regenerative power is dissipated in the resistor 22. As a result, regenerative braking control of the motor is attained.

Accordingly, energy can be efficiently used.

Detection for changeover from the battery 1 to the resistor 22 is not limited to the detection of the battery voltage. The current flowing into the battery, DC circuit current Id, or the amount of the load of the elevator cage may be detected.

Further, the resistor may be connected as shown in FIGS. 19 or 21.

FIGS. 29 to 32 and 34 show other embodiments of the present invention having circuit configuration similar to that of FIG. 12. The same components as those of FIG. 1 are denoted by identical numerals and will not be described here.

Figure 29:
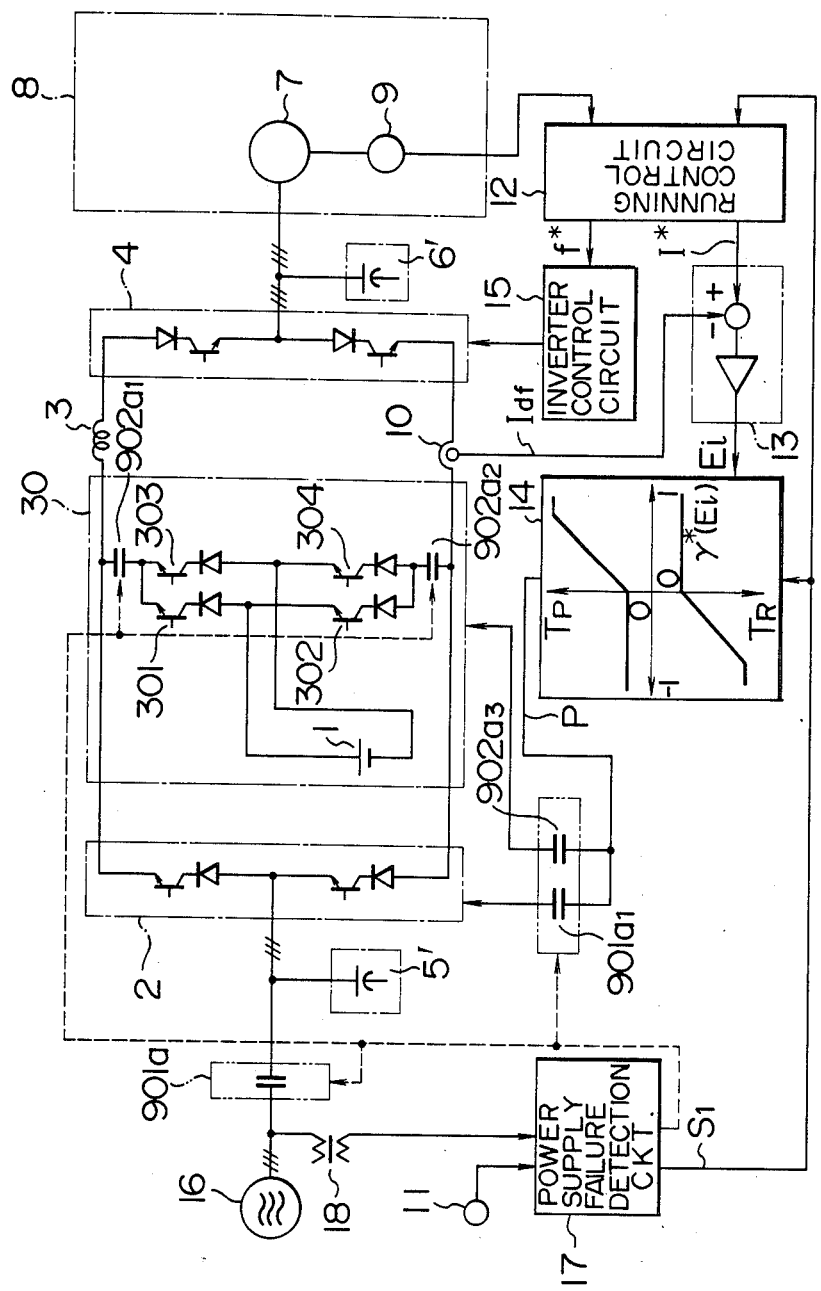

First of all, FIG. 29 shows an embodiment in which the power supply and regenerative braking circuit 2 of FIG. 12 is separately formed.

In FIG. 29, numeral 30 denotes a circuit for performing power supply and regenerative braking during the failure of power supply. The circuit 30 includes a single-phase bridge circuit and a battery 1 connected to the input of the bridge circuit. The single-phase bridge circuit includes four self-arc-suppressing devices 301, 302, 304 and 305 as well as diodes. The above described power supply and regenerative braking circuit 30 is connected to the current-type inverter 4 via a reactor 3 and contactors 902$a_1$ and 902$a_2$ closed when the power supply failure running command is generated.

Further, a drive signal P of self-arc-suppressing devices outputted from the converter control circuit 14 is connected as follows. Under the normal condition, the drive signal P is connected to respective self-arc-suppressing devices 201 to 206 of the current-type converter 20 via a contactor 901$a_1$. During the failure of power supply, the drive signal P is connected to self-arc-suppressing devices 301, 302, 303 and 304 of the power supply and regenerative braking circuit via a contactor 902$a_3$ which is closed when the power supply failure running signal is generated.

In the above described circuit configuration, the converter control circuit has the same configuration as that shown in FIG. 12. And drive signals P201, P202, P203 and P204 corresponding to respective self-arc-suppressing devices 201, 202, 203 and 204 of the current-type converter 2 are associated with self-arc-suppressing devices 301, 302, 303 and 304, respectively. As a result, power control and regenerative control are performed.

Figure 30:
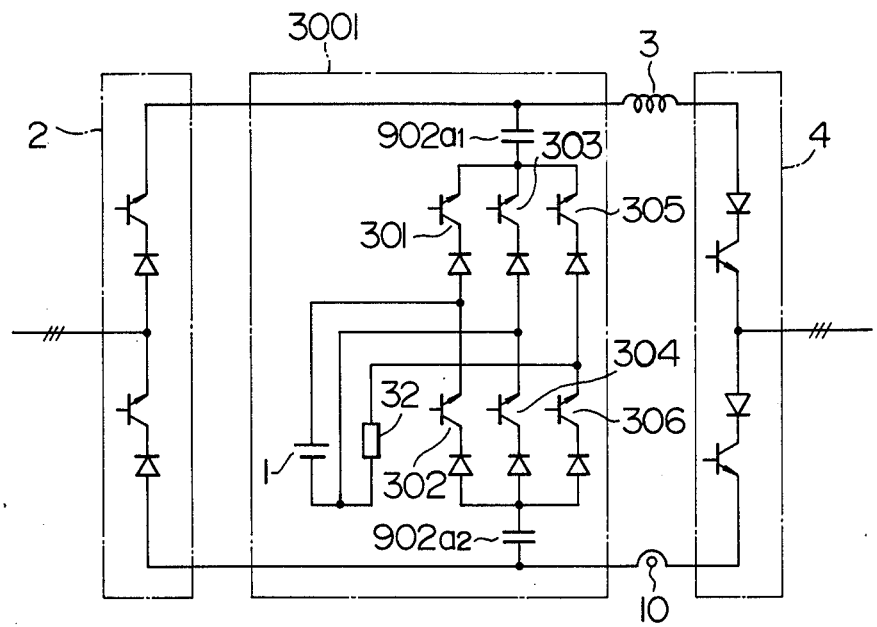
Figure 31:
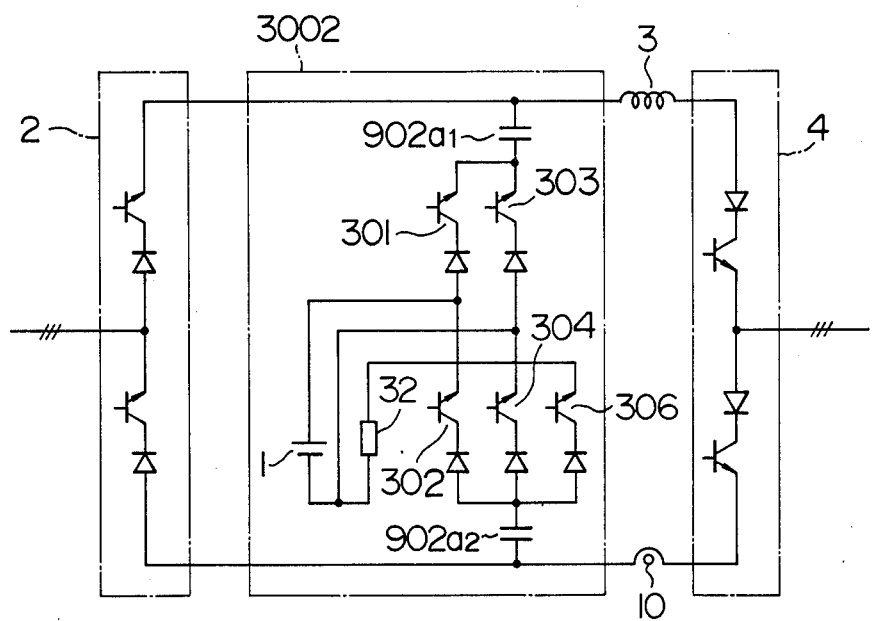
Figure 32:
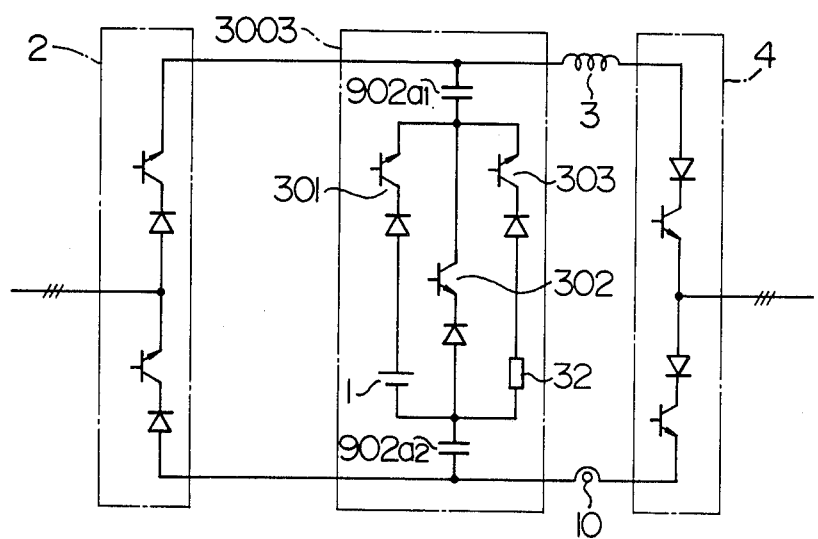

FIGS. 30, 31 and 32 show circuit configuration in which the power supply and regenerative braking circuit shown in FIG. 14 is separately formed.

First of all, the circuit of FIG. 30 includes a power supply and regenerative braking circuit 3001, which in turn includes six self-arc-suppressing devices (301 to 306), diodes, the battery 1 and a resistor 32. The circuit 3001 is connected to the current-type inverter 4 via a reactor 3 and contactors 902$a_1$ and 902$a_2$ which are closed when the power supply failure command is generated. Drive signals of the self-arc-suppressing devices 301 to 306 are associated with drive signals of respective self-arc-suppressing devices 201 to 206 of the current-type converter. By switching the connection when the power supply failure running command is generated, powering control and regenerative braking control can be performed.

Even if either one of the self-arc-suppressing devices 305 and 306 is removed in FIG. 30, regenerative braking can be performed. Therefore, FIG. 31 shows an embodiment in which the power supply and regenerative braking circuit 3002 is formed with the self-arc-suppressing device 305 removed.

Regenerative control in this circuit configuration is attained by forming the circuit state of the conduction period during which the self-arc-suppressing device 303 and 306 is in the on-state and the circuit state of the reflux period during which either 301 and 302 or 303 and 304 are in the on-state.

Alternatively, the self-arc-suppressing device 306 may be removed. The circuit configuration in this case is similar to that of FIG. 31 and hence will not be described.

In a power supply and regenerative braking circuit 3003 shown in FIG. 32, three self-arc-suppressing devices are used. A series connection of self-arc-suppressing device 301 and the battery 1, a series connection of self-arc-suppressing device 303 and a resistor 32, and self-arc-suppressing device 302 are connected in parallel.

Figure 33A:
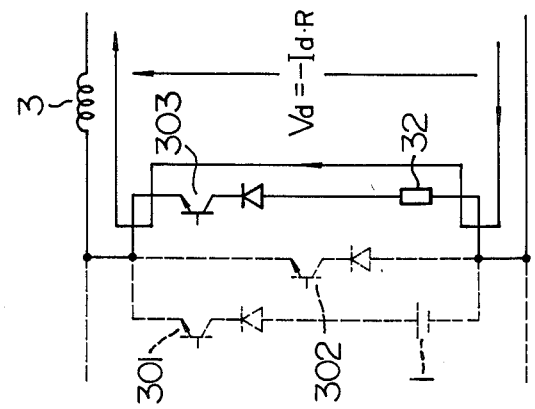
Figure 33B:
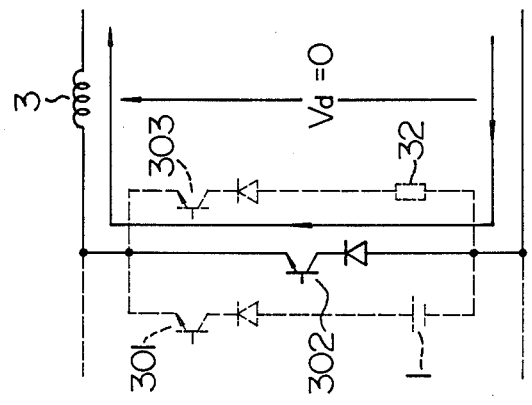
Figure 33C:
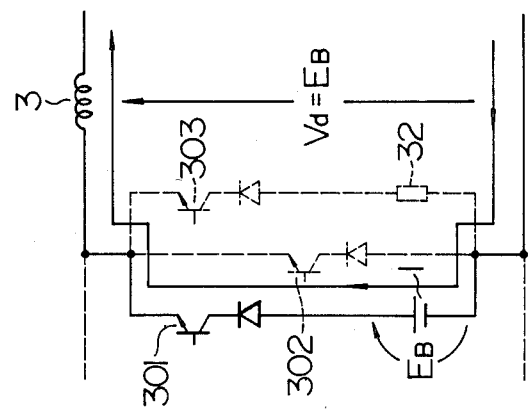

The circuit states formed in the powering control and regenerative control in this case are shown in FIGS. 33A, 33B and 33C.

FIGS. 33A and 33B show circuit states formed during the conduction period and the reflux period in powering control. Powering control can be performed by turning on the self-arc-suppressing device 301 during the conduction period and turning on 302 during the reflux period. Further, FIGS. 33C and 33B show circuits formed during the conduction period and the reflux period in the regenerative control. Regenerative control can be performed by turning on the self-arc-suppressing device 303 during the conduction period and turning on 302 during the reflux period in the same way as the powering control.

Figure 34:
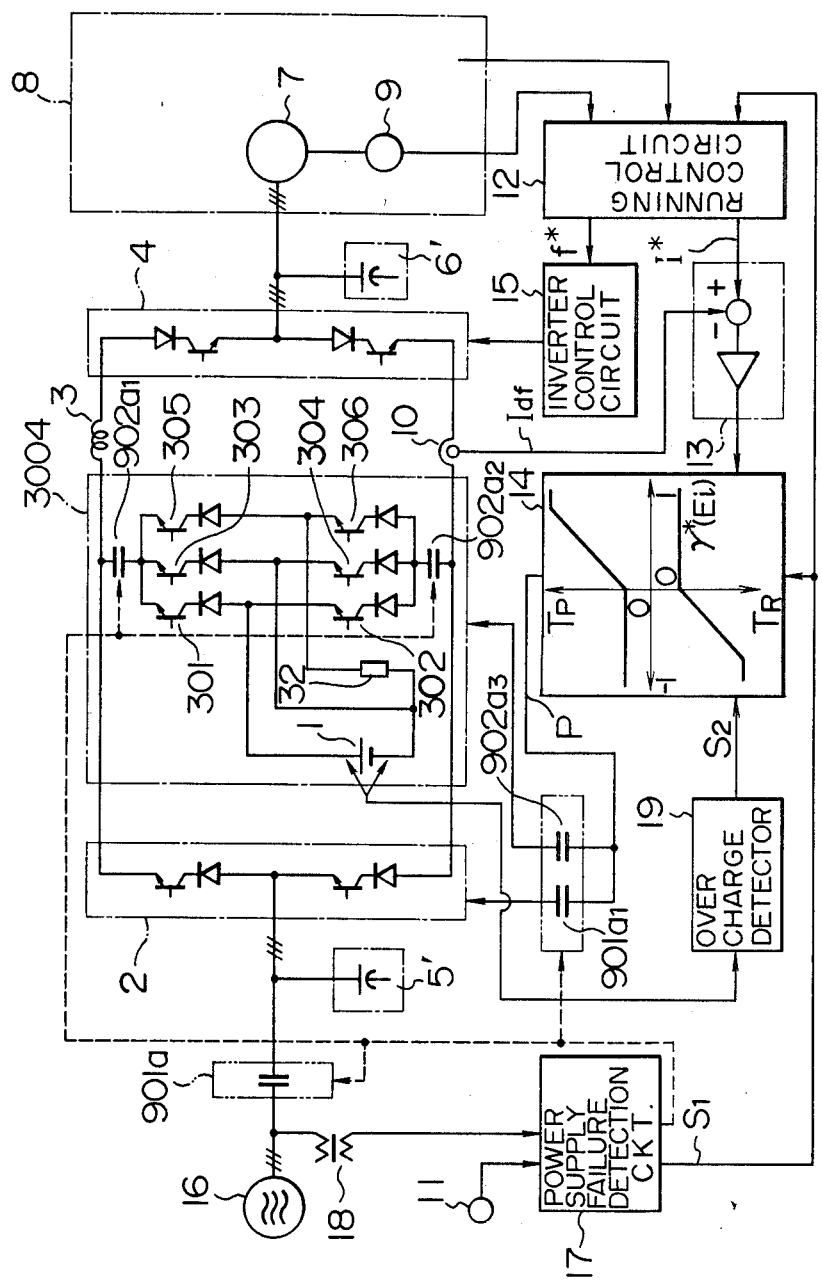

FIG. 34 shows circuit configuration in which the power supply and regenerative braking circuit of FIG. 27 is formed separately as represented by numeral 3004, and the battery 1 is used together with a resistor 32 during the power regeneration to perform the braking control.

The converter control circuit 14 in this case has the same configuration as that shown in FIG. 28. And drive signals of self-arc-suppressing devices 301 to 306 are associated with drive signals of self-arc-suppressing devices 201 to 206 of the current-type converter 2. Changeover is performed by means of a contactor 901$a_1$ normally closed and a contactor 902$a_3$ closed when the power supply failure running command is generated.

In the embodiments shown in FIGS. 30 to 32 and 34, a new power supply and regenerative braking circuit is disposed at the output side of the current-type converter 2 when failure of power supply has occurred. However, the circuit configuration is not limited to this. In alternative circuit configuration, the battery is connected to the input of the current-type converter, and a new regenerative braking circuit including a resistor is connected to the output of the power supply circuit owning jointly the current-type converter and the output of the current-type converter. Alternatively, circuit configuration opposite to the above described configuration may also be used.

We claim:

1. A current-type converter apparatus comprising:
   a DC power source for supplying predetermined DC power;
   a current-type converter connected to output terminals of said DC power source, said current-type converter receiving DC power from said DC power source, performing power conversion control, and outputting the converted power;

a load connected to output terminals of said current-type converter and supplied with output power of said current type converter; and a converter control unit for outputting a predetermined power conversion control signal to said current-type converter, said converter control unit controlling said current-type converter so as to cause at least two states among a powering conduction state for supplying power from said DC power source to said load within predetermined control periods of both a powering control mode and a regenerative control mode, a regenerative conduction state for regenerating power supplied from said load toward said DC power source, and a reflux state for short-circuiting the output of said current-type converter and returning the circuit current of the load, and said converter control unit varying the period length of respective states.

2. A current-type converter apparatus according to claim 1, wherein said converter control unit controls the operation state of the current-type converter over the entire region of output voltage of said current-type converter so that three states, i.e., the powering conduction state, the regenerative conduction state and the reflux state may occur within the predetermined control period.

3. A current-type converter apparatus according to claim 1, wherein said converter control unit controls the operation state of said current-type converter in a range in which the output voltage of said current-type converter is smaller than a predetermined voltage so that three states, i.e., the powering conduction state, the regenerative conduction state and the reflux conduction state may occur within the predetermined period, and said converter control unit controls the operation state of said current-type converter in a range in which the output voltage of said current-type converter is larger than a predetermined voltage so that two states comprising the reflux conduction state and either the powering conduction state or the regenerative conduction state may occur within the predetermined period.

4. A current-type converter apparatus according to claim 1, wherein said DC power source comprises a battery.

5. A current-type converter apparatus according to claim 1, comprising:

an AC power source for supplying predetermined AC power;

changeover means inserted between said AC power source, said DC power source and said current-type converter to connect either said AC power source or said DC power source to said current-type converter; and an AC power source output detection unit disposed for said AC power source so as to detect the presence or absence of output of said AC power source and only upon detection of the output of said AC power source, output a signal to said changeover means to select the AC power source and connect the AC power source to said current-type converter.

6. A current-type converter apparatus according to claim 5, wherein said converter control unit receives the output of said AC power source output detection unit, and wherein when said output is absent, said converter control unit outputs a control signal to said current-type converter so that said current-type converter may operate as a powering power converter and a regenerative power converter, and when said output is present, said converter control unit outputs a control signal to said current-type converter so that said current-type converter may convert AC power to DC power.

7. A current-type converter apparatus according to claim 5, wherein a regenerative power dissipation load for dissipating regenerative power supplied from said load is disposed for said current-type converter, and when said DC power source is connected to said current-type converter by said changeover means, said converter control unit controls said current-type converter so that said current-type converter may assume the regenerative conduction state and the reflux state.

8. A current-type converter apparatus according to claim 7, wherein said regenerative power dissipation load comprises a resistor.

9. A current-type converter apparatus according to claim 5, wherein when said DC power source is connected to said current-type converter by said changeover means, said converter control unit controls said current-type converter so that said current-type converter may perform regenerative power conversion operation with the regenerative conduction state and the reflux state to supply regenerative power to said DC power source and dissipate the regenerative power in the regenerative power dissipation load.

10. A current-type converter apparatus according to claim 5, wherein said DC power source comprises a battery.

11. A current-type converter apparatus according to claim 10, wherein an overcharge detector for detecting an overcharge state of said battery and outputting a signal to said converter control unit is disposed for said battery, and said converter control unit controls said current-type converter so as to regenerate power from the load to said battery when the signal output of said overcharge detector is absent, and so as to dissipate the regenerative power in said regenerative power dissipation load when the signal output of said overcharge detector is present due to the overcharge state.

12. A current-type converter apparatus according to claim 2, comprising:

a first interruption means disposed between said DC power source and the load, said first interruption means being capable of interrupting the connection from the DC power source to the load;

an AC power source for supplying predetermined AC power;

a second current-type converter connected to said AC power source via a second interruption means at the input side and connected to said load at the output side;

a changeover unit disposed between said converter control unit, said current-type converter and said second current-type converter so as to send out output of said converter control unit to either one of said two converters; and an AC power source output detection unit disposed for said AC power source so as to detect the presence or absence of output of said AC power source, upon detection of absence of output of said AC power source, said AC power source output detection unit closing said first interruption means, releasing said second interruption means and outputting the output of said converter control unit to said current-type converter via said changeover unit, and upon detection of presence of output of said AC power source, said AC power source output unit opening said first interruption means, closing said second interruption means and outputting the output of said converter control unit to said second current-type converter via said changeover unit.

13. A current-type converter apparatus according to claim 12, wherein
a regenerative power dissipation load for dissipating the regenerative power is disposed for said current-type converter, and
said converter control section controls said current-type converter so as to assume the regenerative conduction state and the reflux state when said current-type converter is connected to said load via said first interruption means.

14. A current-type converter apparatus according to claim 13, wherein said regenerative power dissipation load comprises a resistor.

15. A current-type converter apparatus according to claim 12, wherein
when said current type converter is connected to said load,
said converter control unit controls said current-type converter so that said current-type converter may perform regenerative power conversion operation with the regenerative conduction state and the reflux state to supply regenerative power to said DC power source and dissipate the regenrative power in said regenerative power dissipation load.

16. A current-type converter apparatus according to claim 12, wherein said DC power source comprises a battery.

17. A current-type converter apparatus according to claim 16, wherein
an overcharge detector for detecting an overcharge state of said battery and outputting a signal to said converter control unit is disposed for said battery, and
said converter control unit controls said current-type converter so as to regenerate power from the load to said battery when the output of said overcharge detector is absent, and so as to dissipate the regenerative power in said regenerative power dissipation load when the signal output of said overcharge detector is present due to the overcharge state.

* * * * *